US012679073B2

(12) United States Patent
Ishii et al.

(10) Patent No.: US 12,679,073 B2
(45) Date of Patent: Jul. 14, 2026

(54) LIGHT MODULATING DEVICE AND MANUFACTURING METHOD THEREFOR

(71) Applicant: DAI NIPPON PRINTING CO., LTD., Tokyo-to (JP)

(72) Inventors: Norio Ishii, Tokyo-to (JP); Nobuyuki Omokawa, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/423,398

(22) PCT Filed: Jan. 23, 2020

(86) PCT No.: PCT/JP2020/002417
§ 371 (c)(1),
(2) Date: Jul. 15, 2021

(87) PCT Pub. No.: WO2020/153450
PCT Pub. Date: Jul. 30, 2020

(65) Prior Publication Data
US 2022/0105710 A1 Apr. 7, 2022

(30) Foreign Application Priority Data
Jan. 25, 2019 (JP) ................................. 2019-011496

(51) Int. Cl.
*B32B 17/10* (2006.01)
*G02F 1/1333* (2006.01)
(52) U.S. Cl.
CPC .. *B32B 17/10504* (2013.01); *B32B 17/10036* (2013.01); *B32B 17/10302* (2013.01); *B32B 17/10761* (2013.01); *B32B 17/10899*

(2013.01); *G02F 1/133331* (2021.01); *B32B 2457/202* (2013.01); *G02F 2202/28* (2013.01)

(58) Field of Classification Search
None
See application file for complete search history.

(56) References Cited

U.S. PATENT DOCUMENTS

2005/0083577 A1* 4/2005 Varaprasad ............. B60R 1/088
359/604
2015/0317015 A1* 11/2015 Eguchi .................. G06F 3/0447
345/174
(Continued)

FOREIGN PATENT DOCUMENTS

CN 102654666 A 9/2012
CN 108885362 A 11/2018
(Continued)

OTHER PUBLICATIONS

Mar. 24, 2020 International Search Report issued in International Patent Application No. PCT/JP2020/002417.
(Continued)

*Primary Examiner* — Anthony J Frost
(74) *Attorney, Agent, or Firm* — Oliff PLC

(57) ABSTRACT

A manufacturing method for a light modulating device includes preparing a first laminated body including a first glass sheet, preparing a second laminated body in which a second glass sheet, a second interlayer, and a light modulating cell are laminated, and bonding the first laminated body and the second laminated body.

4 Claims, 20 Drawing Sheets

(56)　　　　　　　References Cited

U.S. PATENT DOCUMENTS

| | | | |
|---|---|---|---|
| 2017/0072847 A1 | 3/2017 | Frey et al. | |
| 2017/0250367 A1* | 8/2017 | Yasukawa | ............ H10K 50/844 |
| 2018/0307077 A1* | 10/2018 | Miura | ................... G02F 1/1337 |
| 2019/0162991 A1* | 5/2019 | Hagiwara | ............. G02F 1/1333 |
| 2019/0227357 A1* | 7/2019 | Williams | ............. G02F 1/1347 |

FOREIGN PATENT DOCUMENTS

| | | | | |
|---|---|---|---|---|
| CN | 208737145 U | 4/2019 | | |
| JP | S60-100727 U | 7/1985 | | |
| JP | 6135816 B1 | 5/2017 | | |
| JP | 2017-187810 A | 10/2017 | | |
| JP | 2018-065540 A | 4/2018 | | |
| JP | 2018084621 A * | 5/2018 | .............. | G02F 1/13 |
| WO | 2009/005133 A1 | 1/2009 | | |
| WO | 2016/043164 A1 | 3/2016 | | |
| WO | WO-2017082403 A1 * | 5/2017 | ........... | E06B 3/6722 |
| WO | 2017/203809 A1 | 11/2017 | | |
| WO | WO-2018033752 A1 * | 2/2018 | ....... | B32B 17/10504 |

OTHER PUBLICATIONS

Jul. 27, 2021 International Preliminary Report on Patentability issued in International Patent Application No. PCT/JP2020/002417.

Jul. 4, 2023 Office Action issued in Japanese Patent Application No. 2019-011496.

Jun. 4, 2024 Office Action issued in Chinese Application No. 202080011044.8.

May 24, 2024 Office Action issued in Japanese Application No. 2023-181242.

* cited by examiner

LIGHT MODULATING DEVICE AND MANUFACTURING METHOD THEREFOR

The present disclosure relates to a light modulating device and a manufacturing method therefor.

BACKGROUND ART

Hitherto, a light modulating member used in combination with a translucent member, such as a window, and available for electronic blinds and the like that control transmission of ambient light, a light modulating device using such a light modulating member, and the like have been suggested (see, for example, PTL 1 and PTL 2). A liquid crystal film including a liquid crystal layer is known as one of such light modulating members. The liquid crystal film is manufactured by, for example, sandwiching a liquid crystal material with transparent resin substrates including transparent electrodes and further sandwiching the substrates with linearly polarizing plates. The liquid crystal film changes the alignment of liquid crystal by changing the electric field applied between the transparent electrodes. Thus, the liquid crystal film is capable of controlling the transmission amount of ambient light.

CITATION LIST

Patent Literature

PTL 1: Japanese Patent No. 6135816
PTL 2: Japanese Unexamined Patent Application Publication No. 2017-187810

When such a liquid crystal film is applied to a light modulating member available for sunroofs, side windows, and the like of automobiles, the liquid crystal film is suitably sandwiched by a pair of sheets of glass via an interlayer to form laminated glass. However, in laminated glass in which a liquid crystal film is sandwiched, for example, liquid crystal accumulation that is a phenomenon in which a large amount of liquid crystal is locally present tends to occur due to an uneven distribution of liquid crystal, such as when a pressure applied to the surfaces of members at the time when the members are pressure-bonded together, with the result that the quality and appearance of laminated glass having a light modulating function decreases.

An embodiment provides a light modulating device and a manufacturing method therefor, which are capable of evenly distributing liquid crystal in a plane to reduce an occurrence of liquid crystal accumulation that is a phenomenon in which a large amount of liquid crystal is locally present.

SUMMARY OF INVENTION

A manufacturing method for a light modulating device according to the embodiment includes preparing a first laminated body including a first glass sheet, preparing a second laminated body in which a second glass sheet, a second interlayer, and a light modulating cell are laminated, and bonding the first laminated body and the second laminated body.

In the manufacturing method for a light modulating device according to the embodiment, the first laminated body and the second laminated body may be bonded by a sealant.

In the manufacturing method for a light modulating device according to the embodiment, the first glass sheet of the first laminated body and the second glass sheet of the second laminated body may be bonded by the sealant.

In the manufacturing method for a light modulating device according to the embodiment, the first laminated body may further include a first interlayer, and the first interlayer of the first laminated body and the second interlayer of the second laminated body may be bonded by the sealant.

In the manufacturing method for a light modulating device according to the embodiment, the first laminated body may further include a first interlayer and a film, and the film of the first laminated body and the second interlayer of the second laminated body may be bonded by the sealant.

In the manufacturing method for a light modulating device according to the embodiment, the first laminated body may further include a first interlayer and a film, and the film of the first laminated body and the light modulating cell of the second laminated body may be bonded by the sealant.

In the manufacturing method for a light modulating device according to the embodiment, a liquid layer or a resin layer may be provided between the first laminated body and the second laminated body.

In the manufacturing method for a light modulating device according to the embodiment, at least one of the first laminated body and the second laminated body may have an optical film.

In the manufacturing method for a light modulating device according to the embodiment, the first laminated body and the second laminated body may be bonded by a peripheral sealant located around the first laminated body and the second laminated body.

In the manufacturing method for a light modulating device according to the embodiment, the first laminated body or the second laminated body may further include an optically transparent adhesive film, and the first laminated body and the second laminated body may be bonded by the optically transparent adhesive film.

In the manufacturing method for a light modulating device according to the embodiment, the first laminated body may further include a first interlayer, and the first interlayer may be located between the first glass sheet and the optically transparent adhesive film.

In the manufacturing method for a light modulating device according to the embodiment, the optically transparent adhesive film may be located between the first glass sheet and the light modulating cell.

In the manufacturing method for a light modulating device according to the embodiment, the first laminated body or the second laminated body may further include a thermally adhesive resin layer, and the first laminated body and the second laminated body may be bonded by the thermally adhesive resin layer.

In the manufacturing method for a light modulating device according to the embodiment, the first laminated body may further include a first interlayer, and the first interlayer may be located between the first glass sheet and the thermally adhesive resin layer.

In the manufacturing method for a light modulating device according to the embodiment, the thermally adhesive resin layer may be located between the first glass sheet and the light modulating cell.

A light modulating device according to the embodiment includes a first laminated body including a first glass sheet, and a second laminated body in which a second glass sheet, a second interlayer, and a light modulating cell are laminated. The first laminated body and the second laminated body are bonded to each other by a sealant. A gap layer is formed between the first laminated body and the second laminated body.

A light modulating device according to the embodiment includes a first laminated body including a first glass sheet, and a second laminated body in which a second glass sheet, a second interlayer, and a light modulating cell are laminated. The first laminated body and the second laminated body are bonded to each other by a peripheral sealant located around the first laminated body and the second laminated body. A gap layer is formed between the first laminated body and the second laminated body.

A light modulating device according to the embodiment includes a first laminated body including a first glass sheet, and a second laminated body in which a second glass sheet, a second interlayer, and a light modulating cell are laminated. The first laminated body or the second laminated body further includes an optically transparent adhesive film. The first laminated body and the second laminated body are bonded to each other by the optically transparent adhesive film.

A light modulating device according to the embodiment includes a first laminated body including a first glass sheet, and a second laminated body in which a second glass sheet, a second interlayer, and a light modulating cell are laminated. The first laminated body or the second laminated body further includes a thermally adhesive resin layer. The first laminated body and the second laminated body are bonded to each other by the thermally adhesive resin layer.

According to the embodiment of the present disclosure, liquid crystal is evenly distributed in a plane to reduce an occurrence of liquid crystal accumulation that is a phenomenon in which a large amount of liquid crystal is locally present.

DESCRIPTION OF EMBODIMENTS

First Embodiment

Figure 1:
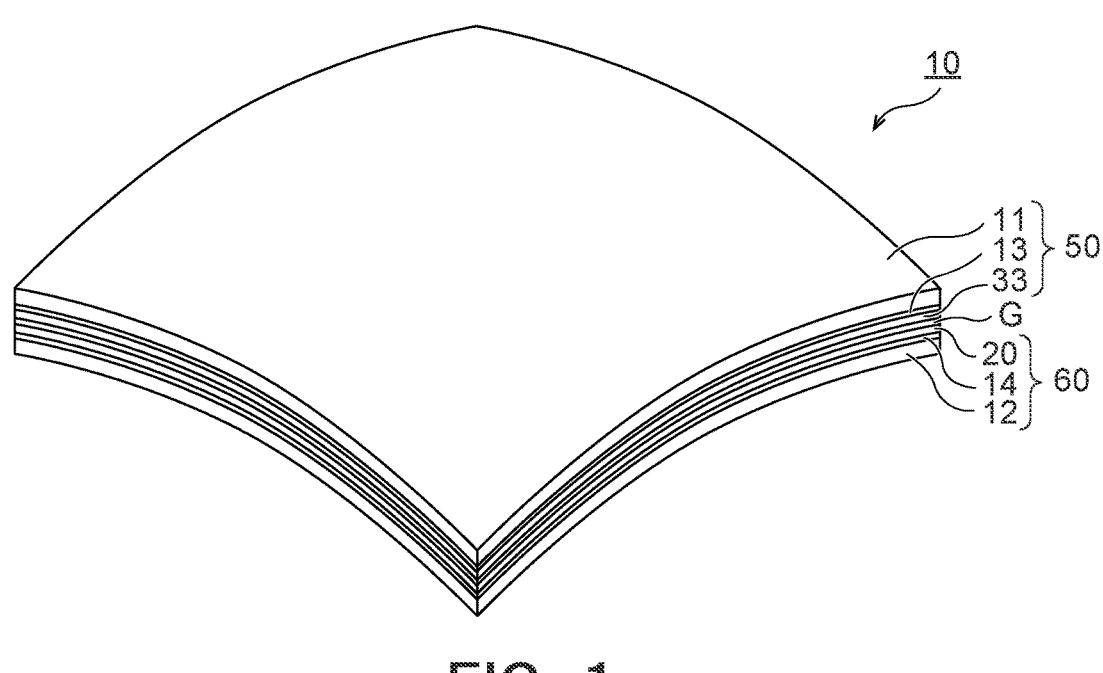
FIG. 1 is a perspective view showing a light modulating device according to a first embodiment.

Hereinafter, a first embodiment will be described with reference to FIG. 1 to FIG. 14.

A light modulating device 10 described below is applicable to various technical fields in which adjustment of light transmittance is desired, and the scope of application is not limited. The light modulating device 10 is placed in, for example, window glasses of buildings, show cases, transparent interior partitions, regions intended for light modulating in windows and the like of vehicles (regions where ambient light enters, for example, windows, such as windshields, side windows, rear windows, and sunroofs). The light modulating device 10 is capable of controlling the amount of incident light into buildings, vehicles, and the like.

The light modulating device 10 described below is only one illustrative embodiment. Therefore, for example, some of elements described below as the component elements of the light modulating device 10 may be replaced with other elements or do not need to be included. Elements not described below may be included as the component elements of the light modulating device 10. In the drawings, for the sake of easiness of illustration and understanding, the scale, dimensional ratio, and the like of some portions are changed or exaggerated as needed from those of real ones.

Light Modulating Device

FIG. 1 is a view showing the light modulating device (laminated glass) 10 according to the present embodiment. The light modulating device 10 according to the present embodiment has a three-dimensional shape such that the surface shape is a curved surface shape. In FIG. 1, for example, the light modulating device 10 has a convex shape on one side. The light modulating device 10 is not limited to this shape. For example, the surface shape may be a planar shape (that is, a flat-plate shape) or may be a two-dimensional shape such that the surface shape is a curved surface shape (for example, a shape making up part of a cylinder) or the like. Here, a three-dimensional shape is not a simple cylindrical surface but a curved surface that cannot be formed only by deforming a plane without expanding or contracting and is distinguished from a two-dimensional shape two-dimensionally curved about a single axis (two-dimensional curved surface) or a two-dimensional shape two-dimensionally curved at different radii of curvature about a plurality of axes parallel to each other (two-dimensional curved surface). In other words, a three-dimensional shape is a shape made up of a surface partially or entirely curved about a plurality of axes inclined relative to each other. In the specification, a plan view means a view in a direction vertical to a principal surface of the light modulating device 10.

As shown in FIG. 1, the light modulating device 10 according to the present embodiment includes a first glass sheet 11, a first interlayer 13, a light modulating cell 20, a second interlayer 14, and a second glass sheet 12. The first glass sheet 11, the first interlayer 13, the light modulating cell 20, the second interlayer 14, and the second glass sheet 12 are laminated in this order. As will be described later, the light modulating device 10 is manufactured by bonding a first laminated body 50 and a second laminated body 60. In the first laminated body 50, the first glass sheet 11, the first interlayer 13, and a film 33 are laminated. In the second laminated body 60, the second glass sheet 12, the second interlayer 14, and the light modulating cell 20 are laminated.

Figure 2:
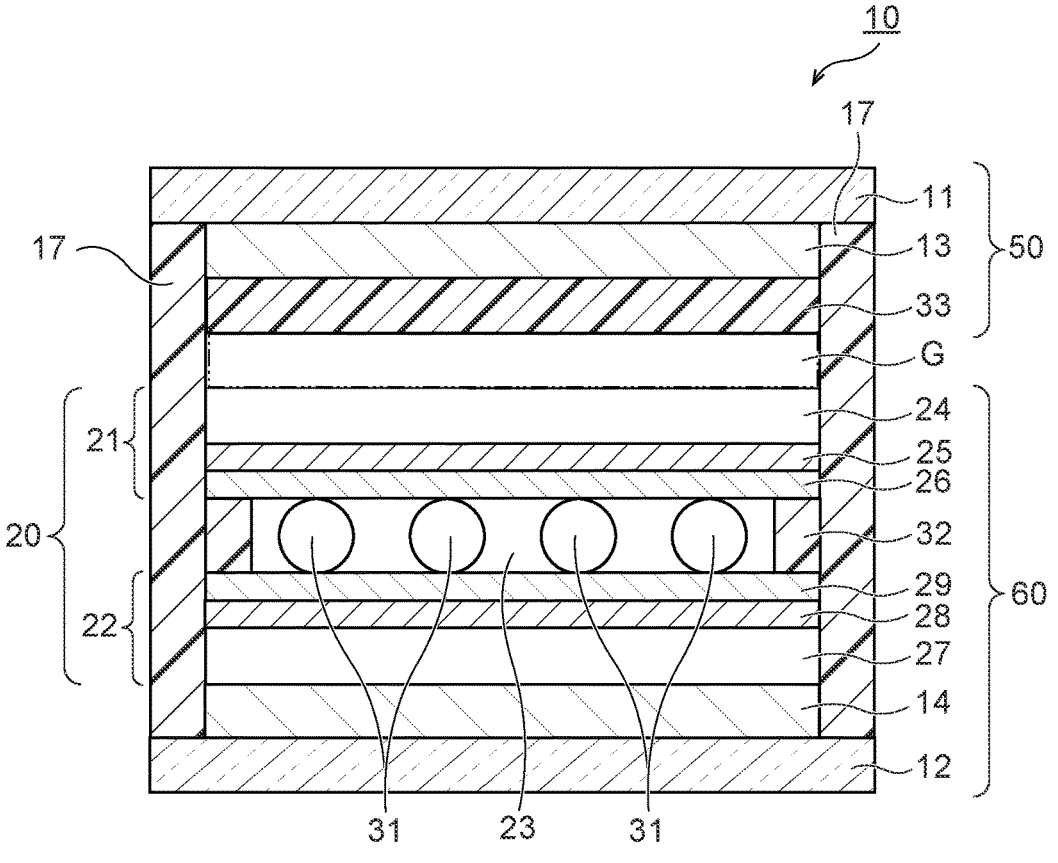
FIG. 2 is a sectional view showing the light modulating device according to the first embodiment.
Figure 3:
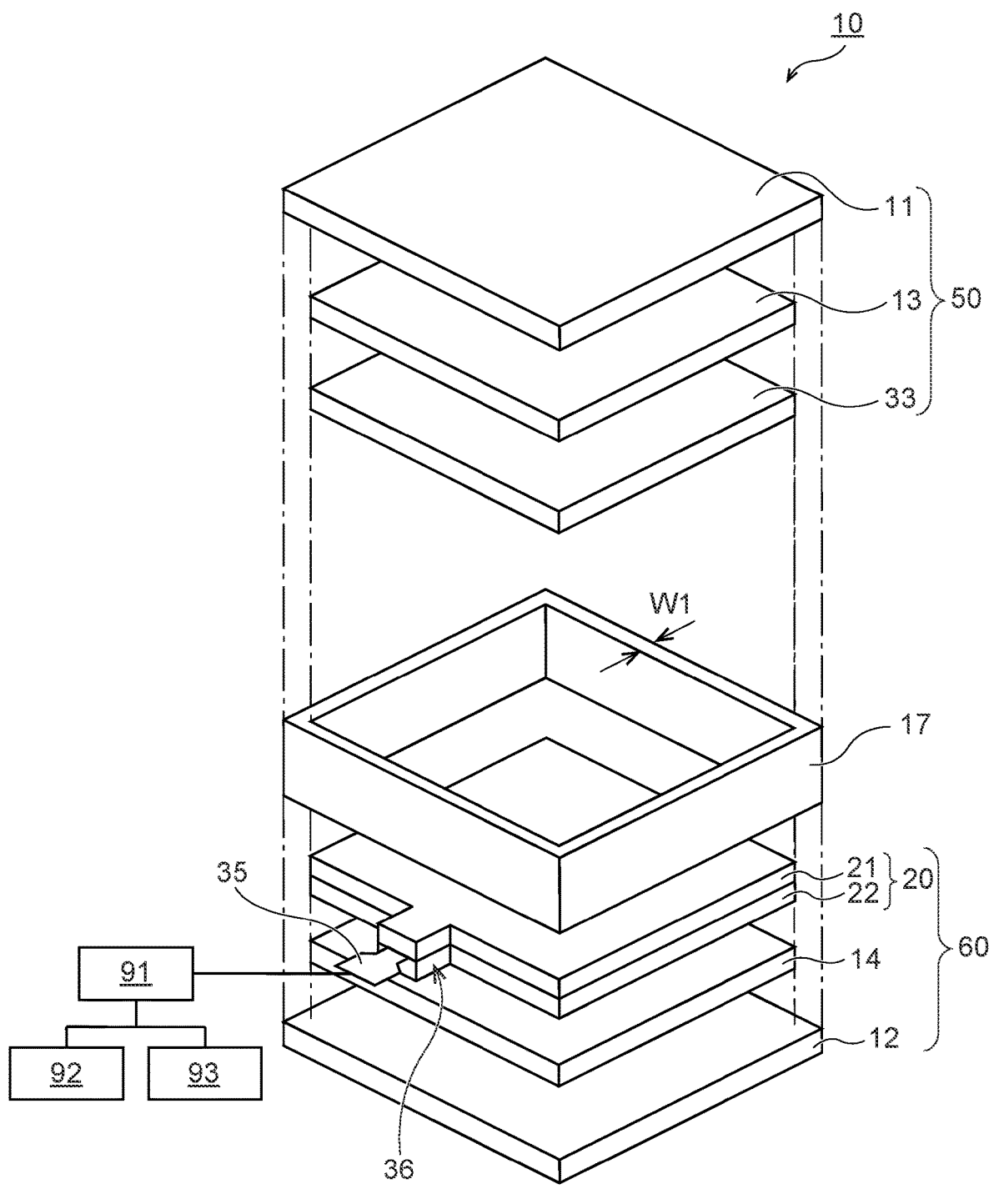
FIG. 3 is an exploded perspective view showing the light modulating device according to the first embodiment.

FIG. 2 is a sectional view showing the layer configuration of the light modulating device 10 according to the present embodiment. FIG. 3 is an exploded perspective view showing the layer configuration of the light modulating device 10 according to the present embodiment. The light modulating device 10 of the present embodiment has a three-dimensional surface shape; however, for the sake of easy understanding, FIG. 2 and FIG. 3 show views in the case where the surface shape of the light modulating device 10 is a planar shape.

As shown in FIG. 2, the light modulating device 10 includes the first glass sheet 11, the second glass sheet 12, and the light modulating cell 20 placed between the first glass sheet 11 and the second glass sheet 12. Of these, the light modulating cell 20 includes a first cell laminated body 21, a second cell laminated body 22, and a liquid crystal layer 23. The first cell laminated body 21 includes a first substrate 24, a first transparent electrode 25, and a first alignment layer 26. The second cell laminated body 22 includes a second substrate 27, a second transparent electrode 28, and a second alignment layer 29. The liquid crystal layer 23 is placed between the first cell laminated body 21 and the second cell laminated body 22.

The first glass sheet (transparent member) 11 and the second glass sheet (transparent member) 12 are respectively placed at the front and back sides of the light modulating device 10 and are sheet glasses having high translucency. Each of the first glass sheet 11 and the second glass sheet 12 is formed in advance into a three-dimensional shape such that the surface shape is a curved surface shape and the curved surface shape is a convex shape on one side (see FIG. 1). In this case, the first glass sheet 11 and the second glass sheet 12 are formed so as to be convex at the first glass sheet 11 side with respect to the second glass sheet 12 side; however, the shape is not limited thereto. The first glass sheet 11 and the second glass sheet 12 may be formed so as to be convex at the second glass sheet 12 side with respect to the first glass sheet 11 side. In the present embodiment, each of the first glass sheet 11 and the second glass sheet 12 has a thickness of greater than or equal to 1 mm and less than or equal to 4 mm. For example, a sheet glass having a thickness of 2 mm is used as each of the first glass sheet 11 and the second glass sheet 12. Each of the first glass sheet 11 and the second glass sheet 12 may be made of inorganic glass or may be made of resin glass. For example, polycarbonate, acrylic, or the like may be used as the resin glass. When inorganic glass is used as each of the first glass sheet 11 and the second glass sheet 12, the light modulating device 10 with high heat resistance and high flaw resistance is obtained. On the other hand, when resin glass is used as each of the first glass sheet 11 and the second glass sheet 12, the weight of the light modulating device 10 is reduced. A surface treatment, such as hard coating, may be applied as needed to each of the first glass sheet 11 and the second glass sheet 12.

The first interlayer 13 is a member for joining the first glass sheet 11 and the light modulating cell 20. Similarly, the second interlayer 14 is a member for joining the second glass sheet 12 and the light modulating cell 20. In the present embodiment, a PVB (polyvinyl butyral) resin sheet is used as each of the first interlayer 13 and the second interlayer 14. The material of each of the first interlayer 13 and the second interlayer 14 is not limited to the PVB. EVA (ethylene vinyl acetate copolymer), COP (cycloolefin polymer), or the like may be used as the material of each of the first interlayer 13 and the second interlayer 14. The thickness of each of the first interlayer 13 and the second interlayer 14 may also be selected as needed according to the material or the like. Specifically, each of the first interlayer 13 and the second interlayer 14 may have a thickness of greater than or equal to 300 μm and less than or equal to 2.5 mm. Each of the first interlayer 13 and the second interlayer 14, for example, has a thickness of 760 μm.

As shown in FIG. 2 and FIG. 3, the first laminated body 50 and the second laminated body 60 are bonded to each other by a sealant 17. The sealant 17 is provided along the inner sides of the peripheries of the first glass sheet 11 and the second glass sheet 12. The sealant 17 has a frame shape or square shape (hollow rectangular shape) in plan view. In this case, the sealant 17 bonds the first glass sheet 11 and the second glass sheet 12 to each other. Specifically, the sealant 17 bonds the inner-side surface (the surface adjacent to the second glass sheet 12) of the first glass sheet 11 and the inner-side surface (the surface adjacent to the first glass sheet 11) of the second glass sheet 12. When the sealant 17 bonds the glass sheets to each other in this way, strong adhesion is obtained. With the sealant 17, the first laminated body 50 and the second laminated body 60 are joined together. For example, a thermosetting resin or an ultraviolet curing resin, such as epoxy resin and acrylic resin, may be used as the sealant 17. The same material as the material of a sealant 32 of the light modulating cell 20 (described later) may be used as the sealant 17. In FIG. 1, the sealant 17 is not shown.

In this case, the first glass sheet 11 and the second glass sheet 12 each are larger in plan view than each of the first interlayer 13, the second interlayer 14, and the light modulating cell 20. The sealant 17 is formed in a region corresponding to the thickness of the first interlayer 13, the second interlayer 14, and the light modulating cell 20 in sectional view. The sealant 17 is formed so as to surround the first interlayer 13, the second interlayer 14, and the light modulating cell 20 in plan view. The sealant 17 has a planar shape such that the shape of each of the first interlayer 13, the second interlayer 14, and the light modulating cell 20 is hollowed from the shape of each of the first glass sheet 11 and the second glass sheet 12. Thus, entry of moisture or the like from the side of the light modulating device 10 is blocked, with the result that penetration of moisture to the first interlayer 13, the second interlayer 14, and the light modulating cell 20 is suppressed. The sealant 17 is also formed between the first glass sheet 11 and the second glass sheet 12 in a region corresponding to a region around the film 33 (described later) and a gap layer G (described later). The thickness of the sealant 17 corresponds to the total thickness of the first interlayer 13, the film 33 (described later), the gap layer G (described later), the light modulating cell 20, and the second interlayer 14 and may be specifically greater than 1080 μm and less than or equal to 12000 μm. The width W1 (FIG. 3) of the sealant 17 is preferably greater than or equal to about 1 mm and less than or equal to about 10 mm.

The light modulating cell 20 (a light modulating film or a liquid crystal film) is a film capable of controlling the amount of transmitted light by changing an applied voltage. The light modulating cell 20 is placed so as to be held between the first glass sheet 11 and the second glass sheet 12. The light modulating cell 20 has a guest-host liquid crystal layer using a dichroism pigment. The light modulating cell 20 is a member that changes the amount of transmitted light by an electric field applied to liquid crystal. The light modulating cell 20 includes the film-like first cell laminated body 21, the film-like second cell laminated body 22, and the liquid crystal layer 23 placed between the first cell laminated body 21 and the second cell laminated body 22.

As shown in FIG. 2, the first cell laminated body 21 is formed by laminating the first substrate 24, the first transparent electrode 25, and the first alignment layer 26. In other words, the first substrate 24, the first transparent electrode 25, and the first alignment layer 26 are laminated in this order from the first interlayer 13 side. The second cell laminated body 22 is formed by laminating the second substrate 27, the second transparent electrode 28, and the second alignment layer 29. In other words, the second substrate 27, the second transparent electrode 28, and the second alignment layer 29 are laminated in this order from the second interlayer 14 side.

A plurality of bead spacers 31 is placed between the first cell laminated body 21 and the second cell laminated body

22. The liquid crystal layer 23 is filled in between the plurality of bead spacers 31 between the first cell laminated body 21 and the second cell laminated body 22. The plurality of bead spacers 31 may be irregularly arranged or regularly arranged.

The light modulating cell 20 changes the alignment of the liquid crystal material made of a guest-host liquid crystal composition provided in the liquid crystal layer 23 by driving the first transparent electrode 25 and the second transparent electrode 28 respectively provided in the first cell laminated body 21 and the second cell laminated body 22, thus changing the amount of transmitted light.

A flexible film made of transparent resin may be used as each of the first substrate 24 and the second substrate 27. It is desirable that a transparent resin film having a low optical anisotropy with a transmittance of 80% or higher at wavelengths in the visible range (greater than or equal to 380 nm and less than or equal to 800 nm) be used as each of the first substrate 24 and the second substrate 27. Examples of the material of the transparent resin film include cellulose acetate resins, such as cellulose triacetate (TAC), polyester resins, such as polyethylene terephthalate (PET) and polyethylene naphthalate (PEN), polyolefin resins, such as polyethylene (PE), polypropylene (PP), polystyrene, polymethyl pentene, and EVA, vinyl resins, such as polyvinyl chloride and polyvinylidene chloride, acrylic resins, polyurethane resins, and resins, such as polysulfone (PEF), polyether sulfone (PES), polycarbonate (PC), polysulfone, polyether (PE), polyether ketone (PEK), (meth)acrylonitrile, cycloolefin polymer (COP), and cycloolefin copolymer. Particularly, resins, such as polycarbonate, cycloolefin polymer, and polyethylene terephthalate, are preferable as the material of the transparent resin film. The thickness of the transparent resin film to be used as each of the first substrate 24 and the second substrate 27 depends on the material and can be selected as needed within the range in which the transparent resin film has flexibility. The thickness of each of the first substrate 24 and the second substrate 27 may be greater than or equal to 50 μm and less than or equal to 200 μm. In the present embodiment, a polyethylene terephthalate film with a thickness of 100 μm is used as an example of each of the first substrate 24 and the second substrate 27.

Each of the first transparent electrode 25 and the second transparent electrode 28 is made up of a transparent conductive film laminated on an associated one of the first substrate 24 and the second substrate 27 (transparent resin film). Various transparent electrode materials to be used as transparent resin films of this type may be used as the transparent conductive film. The transparent conductive film may be a transparent metal thin film made of an oxide with a total light transmittance of higher than or equal to 50%. Examples of the transparent conductive film include tin oxides, indium oxides, and zinc oxides.

Tin oxides ($SnO_2$) include NESA (tin oxide $SnO_2$), ATO (antimony tin oxide: antimony-doped tin oxide), and fluorine-doped tin oxide. Indium oxides ($In_2O_3$) include indium oxide, ITO (indium tin oxide), and IZO (indium zinc oxide). Zinc oxides (ZnO) include zinc oxide, AZO (aluminum-doped zinc oxide), and gallium-doped zinc oxide. In the present embodiment, the transparent conductive film that makes up each of the first transparent electrode 25 and the second transparent electrode 28 is made of ITO.

The bead spacers 31 are members that define the thickness (cell gap) of a portion other than an outer peripheral portion in the liquid crystal layer 23. In the present embodiment, spherical bead spacers are used as the bead spacers 31. The diameter of each bead spacer 31 may be greater than or equal to 1 μm and less than or equal to 20 μm and preferably greater than or equal to 3 μm and less than or equal to 15 μm. A configuration made of an inorganic material, such as silica, a configuration made of an organic material, a configuration of a core-shell structure combining these materials, and other configurations are widely used as the bead spacers 31. The bead spacers may have a rod shape, such as a circular cylinder shape, an elliptic cylinder shape, and a polygonal prism shape, other than a spherical shape. The bead spacers 31 are manufactured from transparent members. Where necessary, the color of the bead spacers 31 may be adjusted by applying a colored material.

In the present embodiment, the bead spacers 31 are provided on the second cell laminated body 22; however, the configuration is not limited thereto. The bead spacers 31 may be provided on both the first cell laminated body 21 and the second cell laminated body 22 or may be provided only on the first cell laminated body 21. Alternatively, the bead spacers 31 do not necessarily need to be provided. Alternatively, instead of the bead spacers 31 or in addition to the bead spacers 31, columnar spacers may be used.

The first alignment layer 26 and the second alignment layer 29 are members for aligning liquid crystal molecules contained in the liquid crystal layer 23 in a desired direction. The first alignment layer 26 and the second alignment layer 29 each are made up of an optical alignment layer. Various materials to which an optical alignment technique is applicable may be widely used as an optical alignment material applicable to the optical alignment layer. Examples of the optical alignment material include a photolytic material, a photodimerization material, and a photoisomerization material. In the present embodiment, a photodimerization material is used. Examples of the photodimerization material include polymers containing cinnamate, coumarin, benzylidene phthalimidine, benzylidene acetophenone, diphenylacetylene, stilbazole, uracil, quinolinone, maleimide, or cinnamylidene acetic acid derivative. Among these materials, in terms of good alignment control force, polymers containing one or both of cinnamate and coumarin are preferably used.

Instead of the optical alignment layer, a rubbing alignment layer may be used. For the rubbing alignment layer, an alignment layer does not need to be subjected to rubbing process or an alignment layer may be prepared by performing rubbing process and molding micro linear asperities. In the present embodiment, the light modulating cell 20 includes the first alignment layer 26 and the second alignment layer 29; however, the configuration is not limited thereto. The light modulating cell 20 does not need to include the first alignment layer 26 or the second alignment layer 29.

A guest-host liquid crystal composition or a dichroism pigment composition may be widely used for the liquid crystal layer 23. A chiral agent may be contained in a guest-host liquid crystal composition to cause the liquid crystal material to be aligned in a spiral shape in the thickness direction of the liquid crystal layer 23 when the liquid crystal material is aligned horizontally. The sealant 32 annular or frame-shaped in plan view is placed so as to surround the liquid crystal layer 23 between the first cell laminated body 21 and the second cell laminated body 22. With the sealant 32, the first cell laminated body 21 and the second cell laminated body 22 are held together, and leakage of the liquid crystal material is prevented. For example, a thermosetting resin or an ultraviolet curing resin, such as epoxy resin and acrylic resin, may be used as the sealant 32.

The first alignment layer 26 and the second alignment layer 29 each are made up of a vertical alignment layer for which alignment control force for pretilt is set in a certain direction such that the guest-host liquid crystal composition during shading of the light modulating cell 20 is aligned during application of electric field. Thus, the light modulating cell 20 is configured to be normally clear. The light modulating cell 20 may be configured to be normally dark by setting the configuration during light transmission is achieved during application of electric field. Here, the normally dark configuration is a structure such that liquid crystal has a minimum transmittance and the screen becomes black when no voltage is applied to the liquid crystal. The normally clear configuration is a structure such that liquid crystal has a maximum transmittance and becomes clear when no voltage is applied.

An example in which the light modulating cell 20 of the present embodiment includes the guest-host liquid crystal layer 23 is described; however, the configuration is not limited thereto. The light modulating cell 20 may include the liquid crystal layer 23 of a TN (twisted nematic) type, a VA (vertical alignment) type, an IPS (in-plane-switching) type, or the like without using a dichroism pigment composition. When the light modulating cell 20 includes the liquid crystal layer 23 of such a type, the light modulating cell 20 can be caused to function as a light modulating film by further providing a linear polarization layer on each of the surfaces of the first substrate 24 and the second substrate 27.

In the present embodiment, the film 33 is placed between the light modulating cell 20 and the first interlayer 13. The film 33 is placed between the first substrate 24 of the light modulating cell 20 and the first interlayer 13, and is joined with the first interlayer 13. The film 33 may be made of transparent resin and may be a resin film having flexibility. It is desirable that a transparent resin film having a low optical anisotropy with a transmittance of 80% or higher at wavelengths in the visible range (greater than or equal to 380 nm and less than or equal to 800 nm) be used as the film 33. The same material as the material of the transparent resin film used for the first substrate 24 and the second substrate 27 may be used as the material of the transparent resin film. The thickness of the film 33 may be, for example, greater than or equal to 50 μm and less than or equal to 250 μm and preferably greater than or equal to 110 μm and less than or equal to 140 μm depending on the material. The planar shape of the film 33 may be substantially the same as the planar shape of each of the first interlayer 13 and the second interlayer 14. The planar shape of the film 33 is substantially the same as the planar shape of the overall light modulating cell 20 and is preferably larger than the planar shape of the liquid crystal layer 23 located inside the sealant 32. With this configuration, the film 33 covers the whole of the liquid crystal layer 23, so an occurrence of liquid crystal accumulation that is a phenomenon in which a large amount of liquid crystal is locally present in part of the liquid crystal layer 23 is reduced over the entire region in the plane.

The gap layer G made up of an air layer is provided between the light modulating cell 20 and the film 33. The gap layer G is formed in the space between the first substrate 24 of the light modulating cell 20 and the film 33. In other words, the first substrate 24 of the light modulating cell 20 and the film 33 are not joined with each other and placed with a certain gap in the thickness direction. Preferably, the thickness of the gap layer G is, for example, greater than or equal to 0 μm and less than or equal to 10000 μm. The planar shape of the gap layer G may be substantially the same as the planar shape of the film 33. In this way, when the gap layer G is formed between the light modulating cell 20 and the film 33, a cell gap defect of the light modulating cell 20 reduces, so an occurrence of liquid crystal accumulation that is a phenomenon in which a large amount of liquid crystal is locally present in part of the liquid crystal layer 23 is reduced. When the gap layer G is provided between the light modulating cell 20 and the film 33, the heat insulation property of the light modulating device 10 improves, with the result that the heat retaining property of a vehicle or building in which the light modulating device 10 is placed is enhanced. The gap layer G may be a gas layer of a gas other than air, such as inert gas, including nitrogen or the like. The light modulating cell 20 and the film 33 do not need to be placed with a certain gap in the thickness direction in the entire region in which the light modulating cell 20 and the film 33 overlap in plan view between the light modulating cell 20 and the film 33 and may be partially joined with each other.

As shown in FIG. 3, the light modulating device 10 is connected to a dimming controller 91, and a sensor device 92 and a user operating portion 93 are connected to the dimming controller 91. The dimming controller 91 is capable of switching between transmission and blocking of light with the light modulating device 10 or changing the transmittance of light in the light modulating device 10 by controlling the light modulating status of the light modulating device 10. Specifically, the dimming controller 91 is connected to an external electrode substrate 35 of the light modulating device 10. The dimming controller 91 is capable of switching between transmission and blocking of light with the light modulating device 10 or changing the transmittance of light by adjusting an electric field to be applied to the liquid crystal layer 23 of the light modulating device 10 to change the alignment of liquid crystal molecules in the liquid crystal layer 23.

The dimming controller 91 is capable of adjusting an electric field to be applied to the liquid crystal layer 23 in accordance with a selected technique. The dimming controller 91 is capable of switching between transmission and blocking of light with the light modulating device 10 or changing the transmittance of light by adjusting an electric field to be applied to the liquid crystal layer 23 in accordance with, for example, a measured result of the sensor device 92 or an instruction (command) input by a user through the user operating portion 93. Therefore, the dimming controller 91 may automatically adjust an electric field to be applied to the liquid crystal layer 23 in accordance with a measured result of the sensor device 92 or may manually adjust the electric field in accordance with an instruction of the user through the user operating portion 93. A measuring object to be measured by the sensor device 92 is not limited. For example, the brightness of a usage environment may be measured. In this case, the light modulating device 10 switches between transmission and blocking of light and changes the transmittance of light according to the brightness of the usage environment. Both the sensor device 92 and the user operating portion 93 do not necessarily need to be connected to the dimming controller 91. Only any one of the sensor device 92 and the user operating portion 93 may be connected to the dimming controller 91.

The external electrode substrate 35 is sandwiched by the first cell laminated body 21 and the second cell laminated body 22. In a region in which the external electrode substrate 35 is formed, the first cell laminated body 21 and the second cell laminated body 22 have an electrode projection 36 that projects outward in the plane direction. The external electrode substrate 35 is embedded in the electrode projection

36. The sealant 17 may also be provided on the electrode projection 36. In this case, the electrode projection 36 and the first glass sheet 11 may be bonded by the sealant 17.

Manufacturing Method for Light Modulating Cell

Next, a manufacturing method for the light modulating cell 20 of the light modulating device 10 according to the present embodiment will be described with reference to FIG. 4A to FIG. 4D and FIG. 5A to FIG. 5C. FIG. 4A to FIG. 4D and FIG. 5A to FIG. 5C are sectional views showing the manufacturing method for the light modulating cell 20 according to the present embodiment.

Figure 4A:
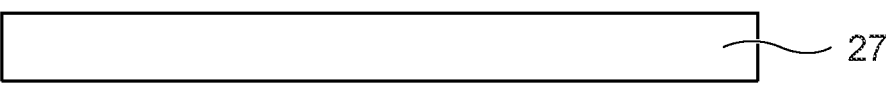
FIG. 4A to FIG. 4D are sectional views showing a manufacturing method for a light modulating cell.
Figure 4B:
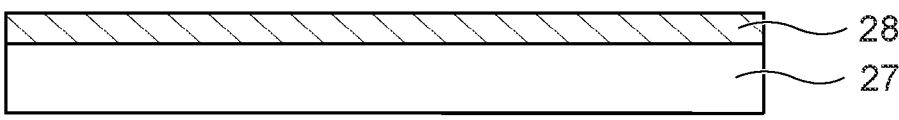

Initially, as shown in FIG. 4A, the second substrate 27 supplied in a roll is prepared. Subsequently, as shown in FIG. 4B, the second transparent electrode 28 made of, for example, ITO is formed on the second substrate 27 by, for example, sputtering with a sputtering apparatus. At this time, the transparent electrode may be patterned into a predetermined pattern shape.

Figure 4C:
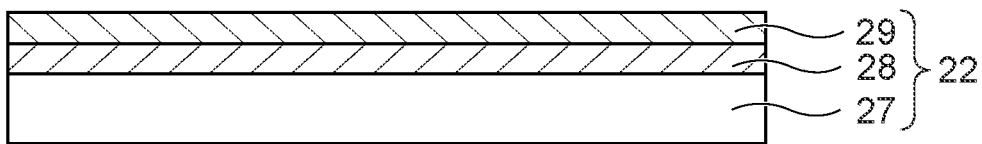

After that, as shown in FIG. 4C, coating liquid for the second alignment layer 29 is applied onto the second substrate 27 on which the second transparent electrode 28 is formed, and then subjected to exposure to prepare the second alignment layer 29. In this way, the second cell laminated body 22 in which the second substrate 27, the second transparent electrode 28, and the second alignment layer 29 are laminated is prepared.

As in the case of the steps shown in FIG. 4A to FIG. 4C, the first cell laminated body 21 in which the first substrate 24, the first transparent electrode 25, and the first alignment layer 26 are laminated is also prepared.

Figure 4D:
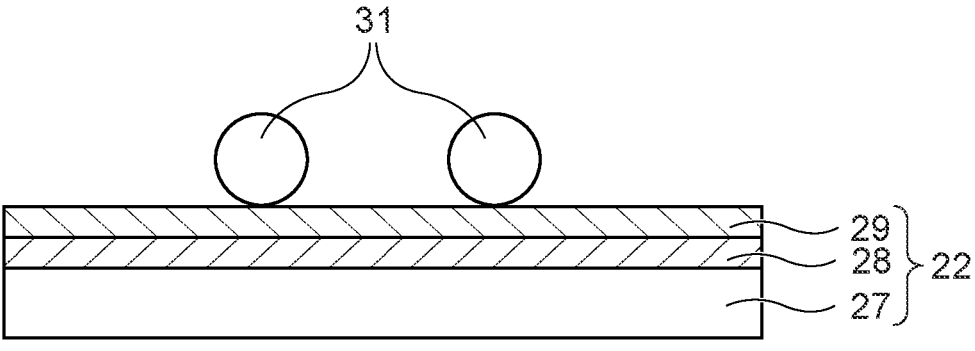

Subsequently, as shown in FIG. 4D, the bead spacers 31 are placed on the second alignment layer 29 of the second cell laminated body 22. Various placement methods, including wet/dry spraying, may be used to place the bead spacers 31. For example, coating liquid manufactured by dispersing the bead spacers 31 in a solvent with a resin component is partially applied, and then sequentially subject to drying and firing processes. Thus, the bead spacers 31 may be randomly placed on the second alignment layer 29 and held so as to be hard to move. Although not shown in the drawing, the outer peripheries of the bead spacers 31 may be covered with the second alignment layer 29. Specifically, by mixing the bead spacers 31 with the coating liquid for the second alignment layer 29 to form the second alignment layer 29, the bead spacers 31 are held so as to be covered with a light coating of the second alignment layer 29.

Figure 5A:
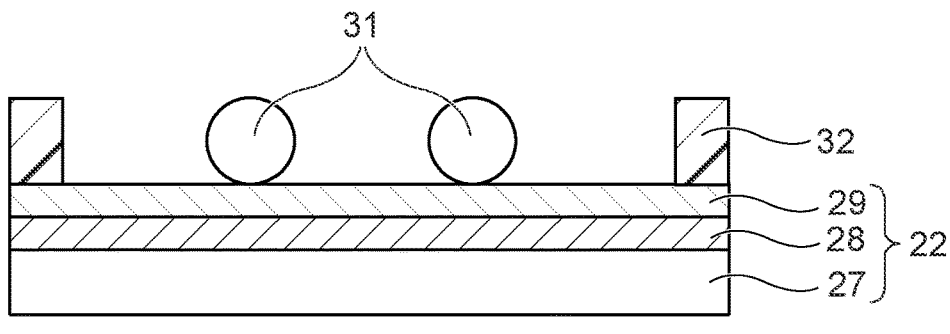
FIG. 5A to FIG. 5C are sectional views showing the manufacturing method for a light modulating cell.

Subsequently, as shown in FIG. 5A, the sealant 32 is applied onto the second alignment layer 29 of the second cell laminated body 22 with a dispenser. The sealant 32 is applied in a frame shape so as to surround a region where the liquid crystal layer 23 is prepared.

Figure 5B:
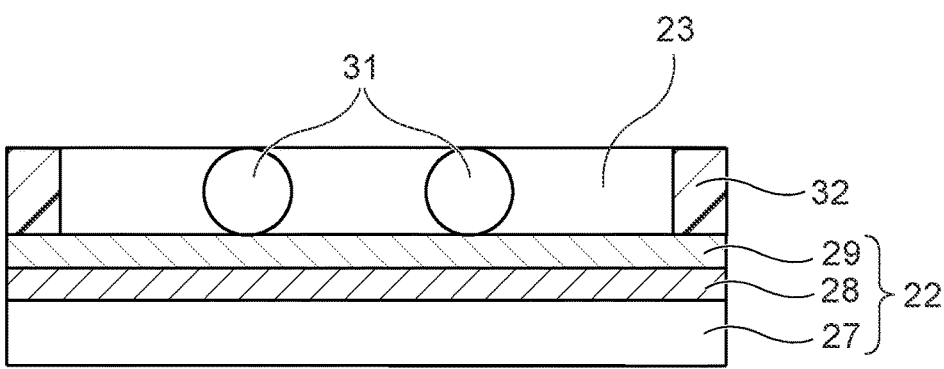
Figure 5C:
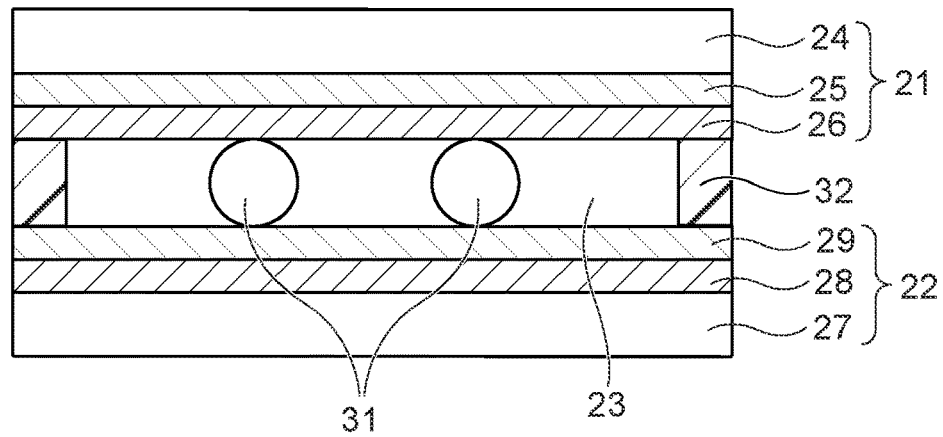

After that, as shown in FIG. 5B and FIG. 5C, the liquid crystal layer 23 is placed by laminating the second cell laminated body 22 and the first cell laminated body 21 on each other. During then, initially, as show in FIG. 5B, liquid crystal for making up the liquid crystal layer 23 is dripped into the region surrounded by the sealant 32. At this time, the liquid crystal layer 23 is filled around the bead spacers 31 inside the sealant 32.

Subsequently, as shown in FIG. 5C, the second cell laminated body 22 on which the liquid crystal layer 23 is placed and the first cell laminated body 21 prepared in advance are laminated on each other and pressed. After that, the sealant 32 is semi-cured by irradiating ultraviolet light, and then heated. Thus, the first cell laminated body 21 and the second cell laminated body 22 are integrated. After that, the laminated body of the first cell laminated body 21 and the second cell laminated body 22, prepared in this way, is trimmed into a desired size.

As described above, after the liquid crystal layer 23 is placed, the second cell laminated body 22 and the first cell laminated body 21 are preferably laminated on each other; however, the configuration is not limited thereto. The liquid crystal layer 23 may be placed after the second cell laminated body 22 and the first cell laminated body 21 are laminated on each other. After that, by attaching the external electrode substrate 35 (see FIG. 3) between the first cell laminated body 21 and the second cell laminated body 22, the light modulating cell 20 according to the present embodiment is obtained.

Manufacturing Method for Light Modulating Device

Figure 7A:
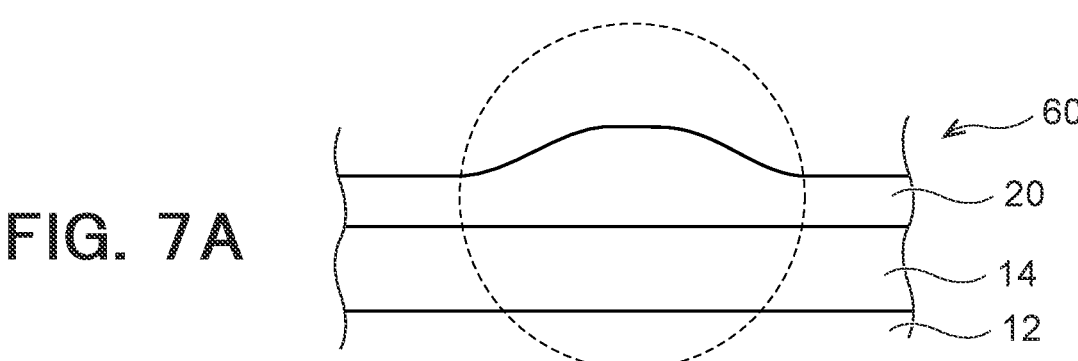
FIG. 7A to FIG. 7C are sectional views showing the action at the time when liquid crystal accumulation in the light modulating cell dissipates after the light modulating device is manufactured.
Figure 7B:
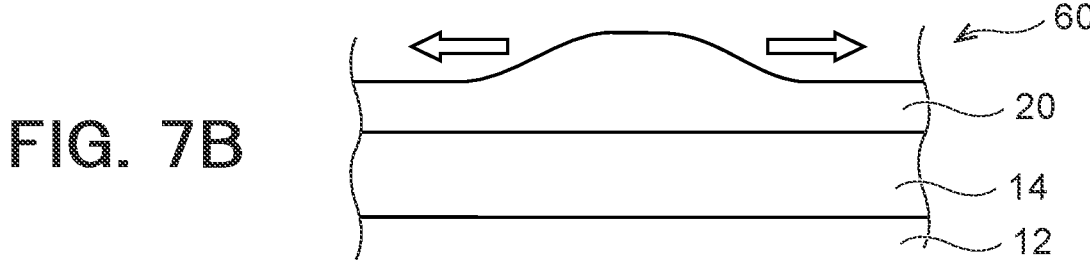
Figure 7C:
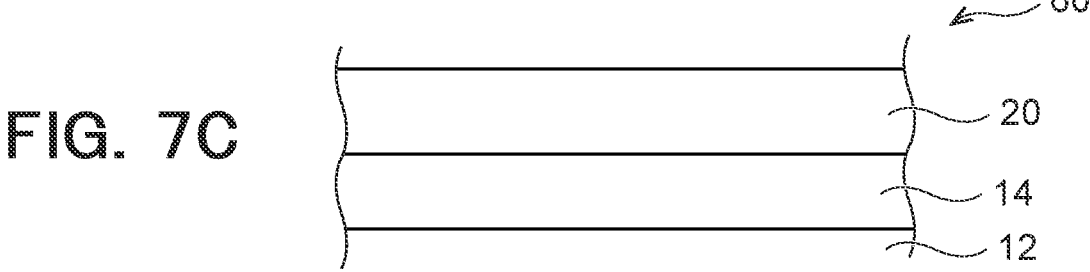
Figure 8A:
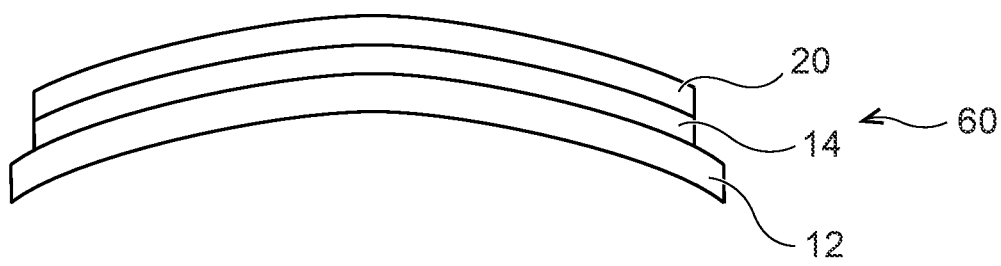
FIG. 8A to FIG. 8C are sectional views showing a manufacturing method (second half) for the light modulating device according to the first embodiment.
Figure 8B:
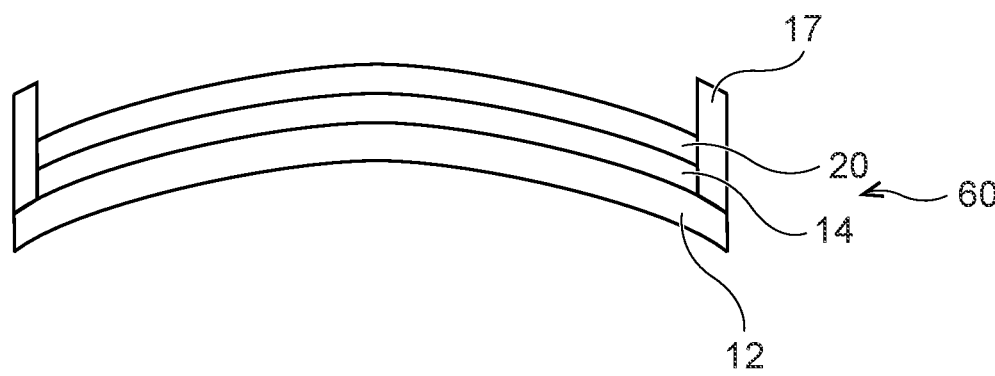
Figure 8C:
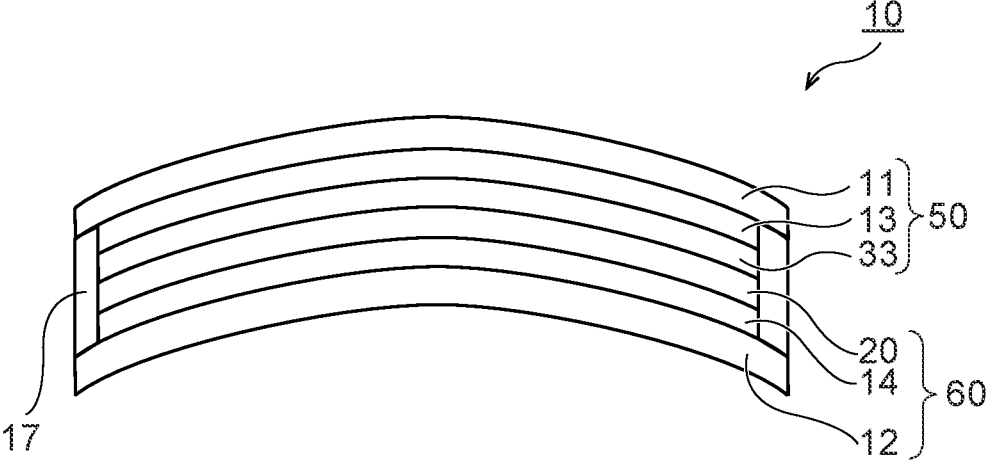

Next, a manufacturing method for the light modulating device 10 according to the present embodiment will be described with reference to FIG. 6A to FIG. 6F, FIG. 7A to FIG. 7C, and FIG. 8A to FIG. 8C. FIG. 6A to FIG. 6F are sectional views showing the manufacturing method (first half) for the light modulating device 10. FIG. 7A to FIG. 7C are sectional views showing the action at the time when liquid crystal accumulation in the light modulating cell dissipates. FIG. 8A to FIG. 8C are sectional views showing the manufacturing method (second half) for the light modulating device 10.

Figure 6A:
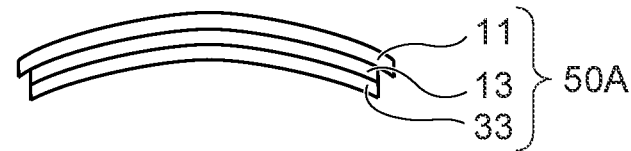
FIG. 6A to FIG. 6F are sectional views showing a manufacturing method (first half) for the light modulating device according to the first embodiment.

Initially, as shown in FIG. 6A, a first laminate intermediate 50A in which the first glass sheet 11, the first interlayer 13, and the film 33 are laminated is prepared. At this time, the first glass sheet 11, the first interlayer 13, and the film 33 are laminated on top of one another but are not joined with one another. The first glass sheet 11 is larger than each of the first interlayer 13 and the film 33 in plan view. The first interlayer 13 and the film 33 are placed in the first glass sheet 11 in plan view. Here, the first glass sheet 11 is molded in advance in a shape of which the surface shape is a curved surface shape that is a three-dimensional shape.

Figure 6B:
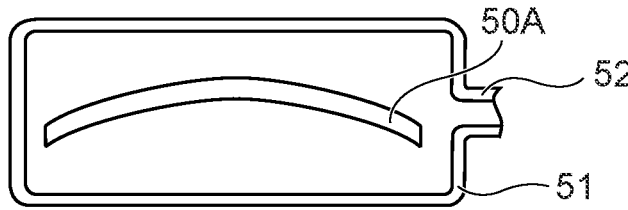

Subsequently, the first laminate intermediate 50A is subjected to a lamination process. Here, the lamination process is a processing method substantially similar to a glass lamination process pursuant to a glass lamination process; however, the lamination process means processing on a laminated body including only one sheet of glass. Specifically, as shown in FIG. 6B, the first laminate intermediate 50A is enclosed in a bag 51. The bag 51 is suitably made of rubber or silicon having flexibility and airtightness. A vent tube 52 is connected to the bag 51, and air in the bag 51 is drawn through the vent tube 52 by a pump (not shown). Thus, air remaining in the first laminate intermediate 50A is drawn, so a pressure bonding defect due to air bubbles or the like remaining in the first laminate intermediate 50A is suppressed. In the present embodiment, an example in which air is drawn such that the inside of the bag 51 and any gap between the members of the first laminate intermediate 50A are in a vacuum state and a pressure of about atmospheric pressure (0.1 MPa) is applied to the first laminate intermediate 50A due to a differential pressure will be described. However, not limited to this configuration, for example, air between the members of the first laminate intermediate 50A may be sufficiently drawn by adjusting the suction force of the pump (not shown) although the inside of the bag 51 is not completely in a vacuum state, and a pressure lower than atmospheric pressure may be applied to the first laminate intermediate 50A due to a differential pressure.

Figure 6C:
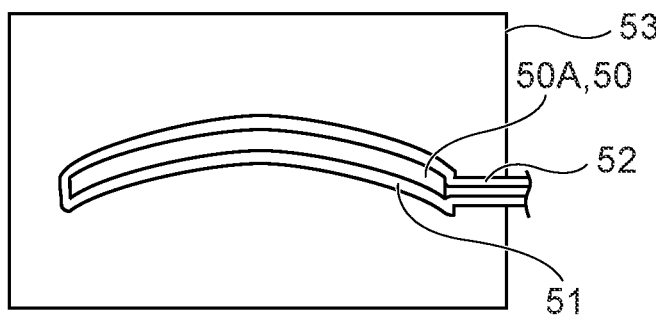

Subsequently, as shown in FIG. 6C, the first laminate intermediate 50A is enclosed in the bag 51, and then the bag 51 as a whole is placed in a heating and pressurizing machine 53. Subsequently, the first laminate intermediate 50A with the bag 51 as a whole is heated at a predetermined temperature for a predetermined time. In the present embodiment, the first laminate intermediate 50A is heated at a temperature higher than or equal to a softening temperature of the first interlayer 13 for the predetermined time. At this time, air in the bag 51 is preferably drawn through the vent tube 52 by the pump (not shown). A machine to be used as the heating and pressurizing machine 53 is not limited as long as the machine is capable of sufficiently heating and pressurizing the first laminate intermediate 50A and may be, for example, an oven, a machine for an autoclave, or the like. Through the heating, the first interlayer 13 melts, and the first glass sheet 11, the first interlayer 13, and the film 33 are pressure-bonded and joined together. In this way, the first laminated body 50 in which the first glass sheet 11, the first interlayer 13, and the film 33 are joined with one another is obtained. After that, the first laminated body 50 is taken out from the heating and pressurizing machine 53.

Figure 6D:
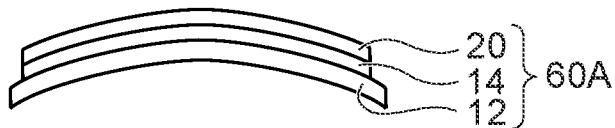

Subsequently, as shown in FIG. 6D, a second laminate intermediate 60A in which the light modulating cell 20, the second interlayer 14, and the second glass sheet 12 are laminated is prepared. At this time, the light modulating cell 20, the second interlayer 14, and the second glass sheet 12 are laminated on top of one another but are not joined with one another. The second glass sheet 12 is larger than each of the light modulating cell 20 and the second interlayer 14 in plan view. The light modulating cell 20 and the second interlayer 14 are placed in the second glass sheet 12 in plan view. Here, the second glass sheet 12 is molded in advance in a shape of which the surface shape is a curved surface shape that is a three-dimensional shape.

Figure 6E:
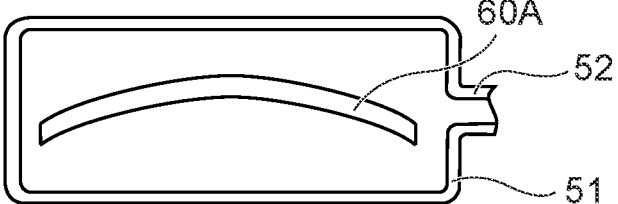

Subsequently, the second laminate intermediate 60A is subjected to a lamination process. Specifically, as shown in FIG. 6E, the second laminate intermediate 60A is enclosed in the bag 51, and air in the bag 51 is drawn such that the inside of the bag 51 and any gap between the members of the second laminate intermediate 60A are in a vacuum state. This step can be similarly performed as in the case of the first laminate intermediate 50A (FIG. 6B).

Figure 6F:
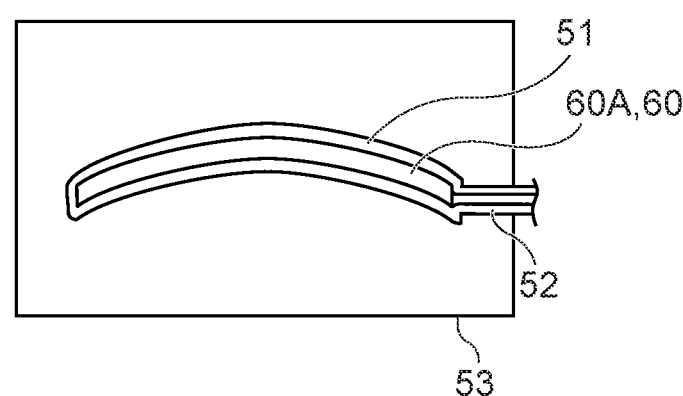

Subsequently, as shown in FIG. 6F, the second laminate intermediate 60A is enclosed in the bag 51, and then the bag 51 as a whole is placed in the heating and pressurizing machine 53 and heated. Through the heating, the second interlayer 14 melts, and the light modulating cell 20, the second interlayer 14, and the second glass sheet 12 of the second laminate intermediate 60A are pressure-bonded and joined together. In this way, the second laminated body 60 in which the light modulating cell 20, the second interlayer 14, and the second glass sheet 12 are joined with one another is obtained. After that, the second laminated body 60 is taken out from the heating and pressurizing machine 53. This step can be similarly performed as in the case of the first laminate intermediate 50A (FIG. 6C).

Incidentally, while the second laminated body 60 is prepared by a lamination process in this way, a pressure is exerted on the members of the second laminated body 60. At this time, in a region in which the spacers (bead spacers 31) are located, the original cell gap (the thickness of the liquid crystal layer 23) is maintained; however, in a region apart from the bead spacers 31, a cell gap is less than the value of the original cell gap. When the cell gap is not uniform in this way, the quality may decrease, for example, an appearance defect occurs in the light modulating device 10 or the light modulating function becomes uneven.

According to the present embodiment, after being taken out from the heating and pressurizing machine 53, the light modulating cell 20 of the second laminated body 60 is exposed outward, so, when the second laminated body 60 is brought back to the normal pressure, a pressure exerted on the liquid crystal layer 23 of the light modulating cell 20 is released. For this reason, even when there is an uneven distribution of the liquid crystal layer 23 of the light modulating cell 20, the uneven distribution of the liquid crystal layer 23 naturally dissipates. In other words, even when there is liquid crystal accumulation (phenomenon in which a large amount of liquid crystal is locally present) in the liquid crystal layer 23 of the light modulating cell 20, the light modulating cell 20 naturally deforms such that the cell gap (the thickness of the liquid crystal layer 23) becomes even at the time when a pressure exerted on the liquid crystal layer 23 is released (see FIG. 7A to FIG. 7C). With this configuration, liquid crystal accumulation in the light modulating cell 20 dissipates, and the liquid crystal layer 23 of the light modulating cell 20 is evenly distributed in the plane, so the quality and appearance of the light modulating device 10 are enhanced.

The order of the step of preparing the first laminated body 50 and the step of preparing the second laminated body 60 does not matter.

Subsequently, as shown in FIG. 8A to FIG. 8C, the first laminated body 50 and the second laminated body 60 are bonded to each other.

In this case, initially, as shown in FIG. 8A, the second laminated body 60 is prepared. The second laminated body 60 may be prepared in, for example, the steps shown in FIG. 6D to FIG. 6F.

After that, as shown in FIG. 8B, the sealant 17 is applied to the second laminated body 60 by drawing. The sealant 17 is applied along the inner side of the periphery of the second glass sheet 12 and is formed outside the second interlayer 14 and the light modulating cell 20 in plan view. At this time, the thickness of the sealant 17 is applied so as to be greater than the total thickness of the second interlayer 14 and the light modulating cell 20.

Subsequently, as shown in FIG. 8C, the first laminated body 50 is prepared. The first laminated body 50 may be prepared in, for example, the steps shown in FIG. 6A to FIG. 6C. After that, the first laminated body 50 and the second laminated body 60 are bonded by the sealant 17 at a normal pressure and a normal pressure. During then, the film 33 of the first laminated body 50 is placed so as to face the second laminated body 60, and the first laminated body 50 and the second laminated body 60 are positioned with respect to each other. Subsequently, the sealant 17 formed on the second laminated body 60 is brought into close contact with the first glass sheet 11 of the first laminated body 50. After that, by curing the sealant 17 with, for example, ultraviolet light (UV) and heat, the first laminated body 50 and the second laminated body 60 are joined. At this time, the gap layer G (see FIG. 2) made up of an air layer is provided between the film 33 of the first laminated body 50 and the light modulating cell 20 of the second laminated body 60. In this way, the first laminated body 50 and the second laminated body 60 are bonded by the sealant 17, and the light modulating device 10 is obtained.

In this way, according to the present embodiment, the light modulating device 10 is prepared by bonding the prepared first laminated body 50 and the prepared second laminated body 60 to each other with the sealant 17. At this time, in the second laminated body 60 prepared by a lamination process, the light modulating cell 20 is exposed outward. Thus, even when there is liquid crystal accumulation (phenomenon in which a large amount of liquid crystal is locally present) in the liquid crystal layer 23 of the light modulating cell 20, the light modulating cell 20 naturally deforms such that the cell gap (the thickness of the liquid crystal layer 23) becomes even at the time when a pressure exerted on the liquid crystal layer 23 is released after the light modulating device 10 is prepared (see FIG. 7A to FIG. 7C). With this configuration, liquid crystal accumulation in the light modulating cell 20 dissipates, and the liquid crystal layer 23 of the light modulating cell 20 is evenly distributed in the plane, so the quality and appearance of the light modulating device 10 are enhanced. Since liquid crystal accumulation is hard to occur in the light modulating cell 20, it is easy to reduce the thickness of each of the first interlayer 13 and the second interlayer 14.

According to the present embodiment, a glass lamination process is not performed in a state where the light modulating cell 20 and the film 33 are stacked on top of each other. Therefore, to maintain the thickness (gap) of the gap layer G between the light modulating cell 20 and the film 33, no spacer or the like needs to be placed between the film 33 and the first substrate 24. Hence, the shape of the spacer placed between the film 33 and the first substrate 24 is transferred to the light modulating cell 20 at the time of a glass lamination process, and there is no concern about an occurrence of asperities on the light modulating cell 20.

According to the present embodiment, the first glass sheet 11 of the first laminated body 50 and the second glass sheet 12 of the second laminated body 60 are bonded by the sealant 17. When the sealant 17 bonds the glass sheets to each other in this way, strong adhesion is obtained.

According to the present embodiment, the sealant 17 is formed so as to surround the first interlayer 13, the second interlayer 14, and the light modulating cell 20. Thus, entry of moisture or the like from the side of the light modulating device 10 is blocked, with the result that penetration of moisture to the first interlayer 13, the second interlayer 14, and the light modulating cell 20 is suppressed.

Modifications of First Embodiment

Next, various modifications of the present embodiment will be described with reference to FIG. 9 to FIG. 14. FIG. 9 to FIG. 14 are views respectively showing light modulating devices according to the modifications of the present embodiment. In FIG. 9 to FIG. 14, like reference signs are assigned to the same portions as those of the embodiment shown in FIG. 1 to FIG. 8, and the detailed description is omitted.

First Modification of First Embodiment

Figure 9:
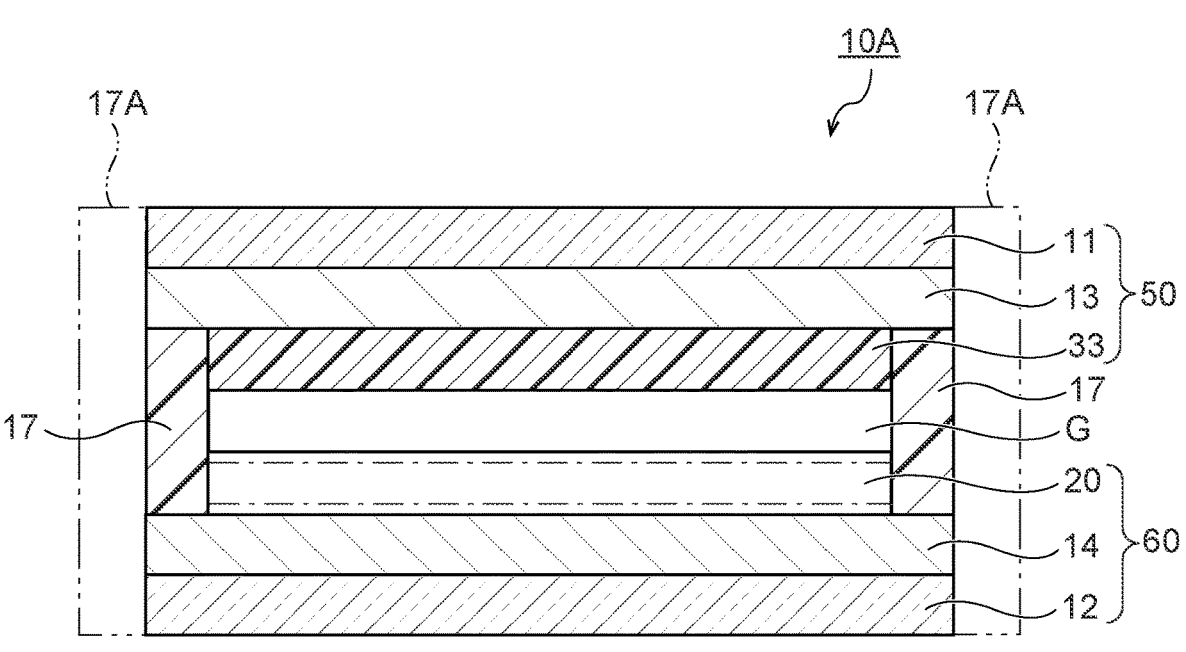
FIG. 9 is a sectional view showing a light modulating device according to a first modification of the first embodiment.

FIG. 9 shows a light modulating device 10A according to a first modification of the present embodiment. In the light modulating device 10A shown in FIG. 9, the first interlayer 13 of the first laminated body 50 and the second interlayer 14 of the second laminated body 60 are bonded by the sealant 17. In this case, the sealant 17 bonds the inner-side surface (the surface adjacent to the second glass sheet 12) of the first interlayer 13 and the inner-side surface (the surface adjacent to the first glass sheet 11) of the second interlayer 14. Each of the first glass sheet 11, the second glass sheet 12, the first interlayer 13, and the second interlayer 14 is larger in plan view than each of the film 33 and the light modulating cell 20. The sealant 17 is formed in a region corresponding to the thickness of the film 33, the gap layer G, and the light modulating cell 20 in sectional view.

When the light modulating device 10A shown in FIG. 9 is prepared, the first laminated body 50 in which the first glass sheet 11, the first interlayer 13, and the film 33 are joined with one another is prepared by substantially a similar lamination process to the steps shown in FIG. 6A to FIG. 6C. The second laminated body 60 in which the light modulating cell 20, the second interlayer 14, and the second glass sheet 12 are joined with one another is prepared by a lamination process substantially similar to the steps shown in FIG. 6D to FIG. 6F. After that, the sealant 17 is applied to the second interlayer 14 of the second laminated body 60, and the sealant 17 is brought into close contact with the first interlayer 13 of the first laminated body 50 and cured, with the result that the first laminated body 50 and the second laminated body 60 are joined. In this way, the first laminated body 50 and the second laminated body 60 are bonded by the sealant 17, and the light modulating device 10A shown in FIG. 9 is obtained.

According to the present modification, entry of moisture or the like from the side of the light modulating device 10A is blocked, with the result that penetration of moisture to the light modulating cell 20 is suppressed. In FIG. 9, an additional sealant 17A (imaginary line) may be provided around the first laminated body 50 and the second laminated body 60. The sealant 17A may be made of the same material as the material of the sealant 17 or may be made of a material different from the material of the sealant 17. In this case, penetration of moisture to the first interlayer 13, the light modulating cell 20, and the second interlayer 14 is suppressed.

Second Modification of First Embodiment

Figure 10:
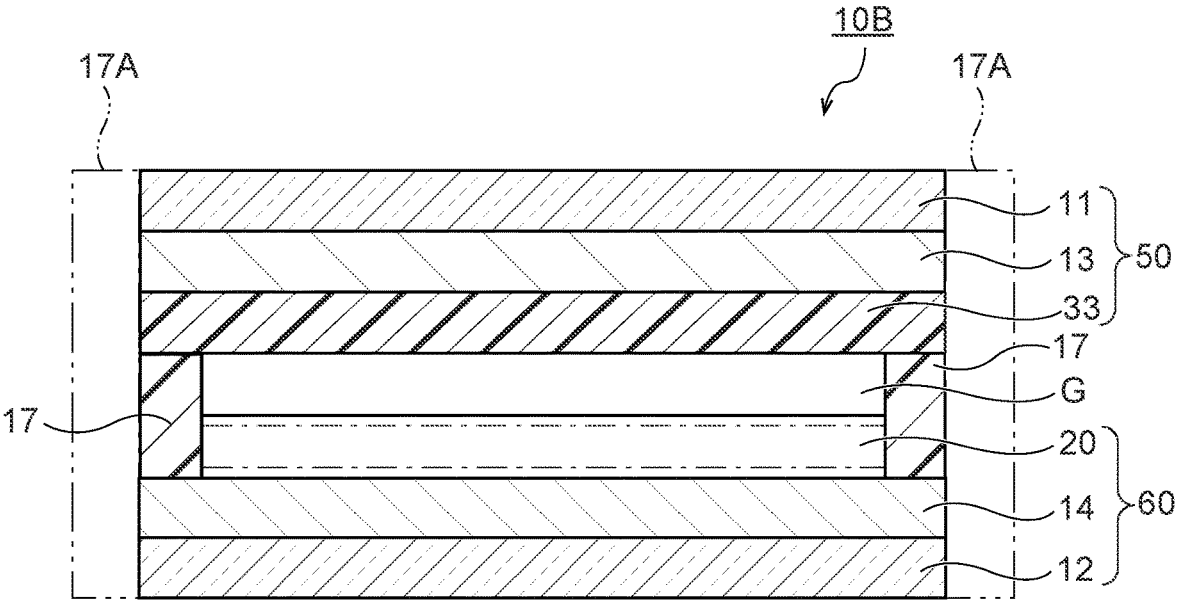
FIG. 10 is a sectional view showing a light modulating device according to a second modification of the first embodiment.

FIG. 10 shows a light modulating device 10B according to a second modification. In the light modulating device 10B shown in FIG. 10, the film 33 of the first laminated body 50 and the second interlayer 14 of the second laminated body 60 are bonded by the sealant 17. In this case, the sealant 17 bonds the inner-side surface (the surface adjacent to the second glass sheet 12) of the film 33 and the inner-side surface (the surface adjacent to the first glass sheet 11) of the second interlayer 14. Each of the first glass sheet 11, the second glass sheet 12, the first interlayer 13, the second interlayer 14, and the film 33 is larger in plan view than the light modulating cell 20. The sealant 17 is formed in a region corresponding to the thickness of the gap layer G and the light modulating cell 20 in sectional view.

When the light modulating device 10B shown in FIG. 10 is prepared, the first laminated body 50 in which the first glass sheet 11, the first interlayer 13, and the film 33 are joined with one another is prepared by a substantially similar lamination process to the steps shown in FIG. 6A to FIG. 6C. The second laminated body 60 in which the light modulating cell 20, the second interlayer 14, and the second glass sheet 12 are joined with one another is prepared by a lamination process substantially similar to the steps shown in FIG. 6D to FIG. 6F. After that, the sealant 17 is applied to the second interlayer 14 of the second laminated body 60, and the sealant 17 is brought into close contact with the film 33 of the first laminated body 50 and cured, with the result that the first laminated body 50 and the second laminated body 60 are joined. In this way, the first laminated body 50 and the second laminated body 60 are bonded by the sealant 17, and the light modulating device 10B shown in FIG. 10 is obtained.

According to the present modification, entry of moisture or the like from the side of the light modulating device 10B is blocked, with the result that penetration of moisture to the light modulating cell 20 is suppressed. In FIG. 10, an additional sealant 17A (imaginary line) may be provided around the first laminated body 50 and the second laminated body 60. The sealant 17A may be made of the same material as the material of the sealant 17 or may be made of a material different from the material of the sealant 17. In this case, penetration of moisture to the first interlayer 13 and the second interlayer 14 is suppressed.

Third Modification of First Embodiment

Figure 11:
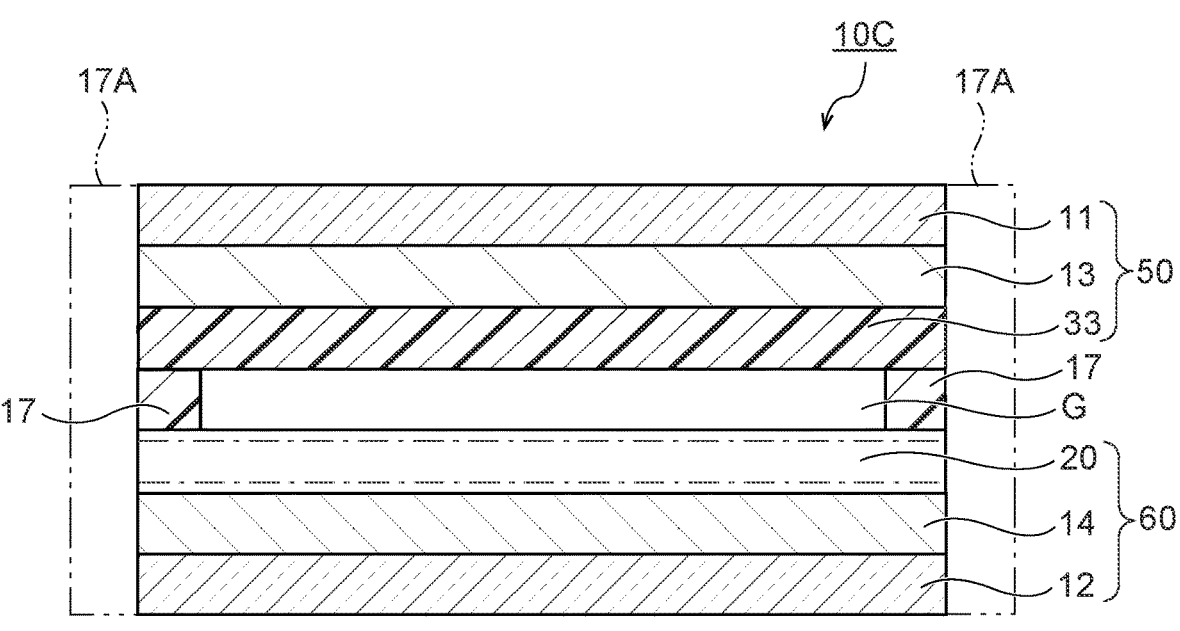
FIG. 11 is a sectional view showing a light modulating device according to a third modification of the first embodiment.

FIG. 11 shows a light modulating device 10C according to a third modification. In the light modulating device 10C shown in FIG. 11, the film 33 of the first laminated body 50 and the light modulating cell 20 of the second laminated body 60 are bonded by the sealant 17. In this case, the sealant 17 bonds the inner-side surface (the surface adjacent to the second glass sheet 12) of the film 33 and the inner-side surface (the surface adjacent to the first glass sheet 11) of the light modulating cell 20. The first glass sheet 11, the second glass sheet 12, the first interlayer 13, the second interlayer 14, the film 33, and the light modulating cell 20 have substantially the same shape in plan view. The sealant 17 is formed in a region corresponding to the thickness of the gap layer G in sectional view.

When the light modulating device 10C shown in FIG. 11 is prepared, the first laminated body 50 in which the first glass sheet 11, the first interlayer 13, and the film 33 are joined with one another is prepared by a lamination process substantially similar to the steps shown in FIG. 6A to FIG. 6C. The second laminated body 60 in which the light modulating cell 20, the second interlayer 14, and the second glass sheet 12 are joined with one another is prepared by a lamination process substantially similar to the steps shown in FIG. 6D to FIG. 6F. After that, the sealant 17 is applied to the light modulating cell 20 of the second laminated body 60, and the sealant 17 is brought into close contact with the film 33 of the first laminated body 50 and cured, with the result that the first laminated body 50 and the second laminated body 60 are joined. In this way, the first laminated body 50 and the second laminated body 60 are bonded by the sealant 17, and the light modulating device 10C shown in FIG. 11 is obtained.

In FIG. 11, an additional sealant 17A (imaginary line) may be provided around the first laminated body 50 and the second laminated body 60. The sealant 17A may be made of the same material as the material of the sealant 17 or may be made of a material different from the material of the sealant 17. In this case, penetration of moisture to the first interlayer 13, the second interlayer 14, and the light modulating cell 20 is suppressed.

Fourth Modification of First Embodiment

Figure 12:
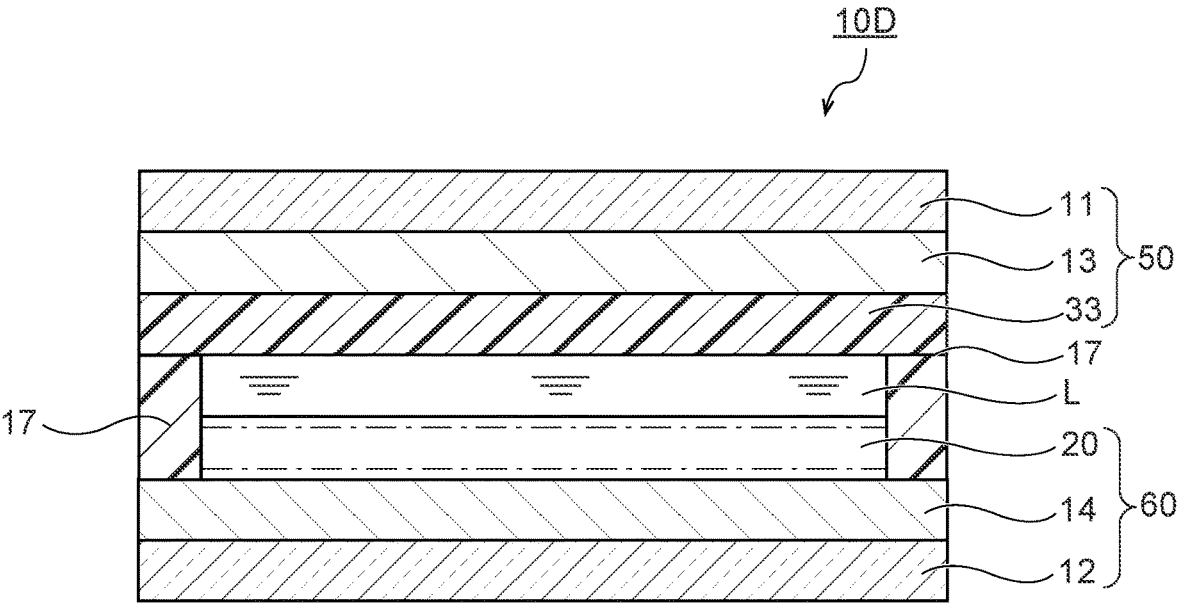
FIG. 12 is a sectional view showing a light modulating device according to a fourth modification of the first embodiment.

FIG. 12 shows a light modulating device 10D according to a fourth modification. In the light modulating device 10D shown in FIG. 12, a liquid layer L is provided between the film 33 of the first laminated body 50 and the light modulating cell 20 of the second laminated body 60. The liquid layer L is enclosed in the space between the light modulating cell 20 and the film 33. The liquid layer L is made up of transparent liquid. For example, glycerin or the like may be used for the liquid layer L. The thickness of the liquid layer L may be greater than or equal to 4 μm and less than or equal to 200 μm.

When the light modulating device 10D shown in FIG. 12 is prepared, the first laminated body 50 in which the first glass sheet 11, the first interlayer 13, and the film 33 are joined with one another is prepared by a lamination process substantially similar to the steps shown in FIG. 6A to FIG. 6C. The second laminated body 60 in which the light modulating cell 20, the second interlayer 14, and the second glass sheet 12 are joined with one another is prepared by a lamination process substantially similar to the steps shown in FIG. 6D to FIG. 6F. Subsequently, the sealant 17 is applied to the light modulating cell 20 of the second laminated body 60, and the liquid layer L is filled between the first laminated body 50 and the second laminated body 60. After that, the sealant 17 is brought into close contact with the film 33 of the first laminated body 50 and cured, with the result that the first laminated body 50 and the second laminated body 60 are joined. In this way, the first laminated body 50 and the second laminated body 60 are bonded by the sealant 17, and the light modulating device 10D shown in FIG. 12 is obtained.

According to the present modification, since the liquid layer L is provided between the light modulating cell 20 and the film 33, reflection of light at the interface between the light modulating cell 20 and the gap layer F or the interface between the film 33 and the gap layer G, which can occur when the gap layer G is provided between the light modulating cell 20 and the film 33, is suppressed.

Fifth Modification of First Embodiment

Figure 13:
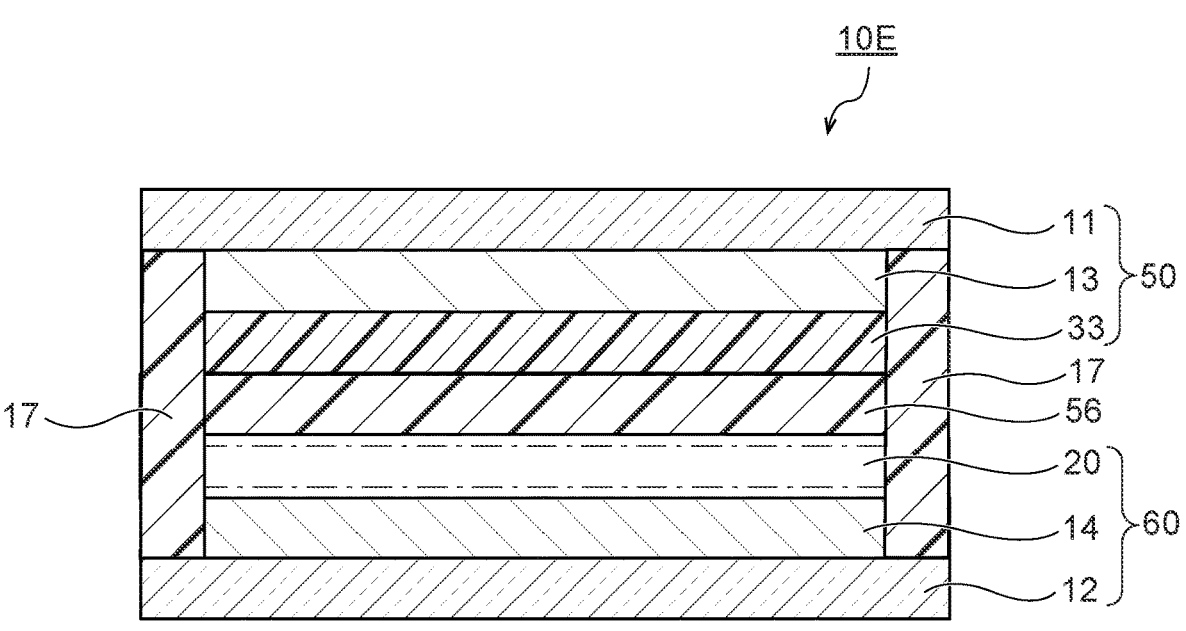
FIG. 13 is a sectional view showing a light modulating device according to a fifth modification of the first embodiment.

FIG. 13 shows a light modulating device 10E according to a fifth modification. In the light modulating device 10E shown in FIG. 13, a resin layer 56 is provided between the film 33 of the first laminated body 50 and the light modulating cell 20 of the second laminated body 60. The resin layer 56 is enclosed in the space between the light modulating cell 20 and the film 33. For example, a transparent adhesive resin called OCR (optical clear resin) or the same resin as that of the sealant 17 may be used as the resin layer 56. The thickness of the resin layer 56 may be greater than or equal to 4 μm and less than or equal to 200 μm.

When the light modulating device 10E shown in FIG. 13 is prepared, the first laminated body 50 in which the first glass sheet 11, the first interlayer 13, and the film 33 are joined with one another is prepared by a lamination process substantially similar to the steps shown in FIG. 6A to FIG. 6C. The second laminated body 60 in which the light modulating cell 20, the second interlayer 14, and the second glass sheet 12 are joined with one another is prepared by a lamination process substantially similar to the steps shown in FIG. 6D to FIG. 6F. Subsequently, the sealant 17 is applied to the light modulating cell 20 of the second laminated body 60, and the resin layer 56 is filled between the first laminated body 50 and the second laminated body 60. After that, the sealant 17 is brought into close contact with the film 33 of the first laminated body 50 and cured, with the result that the first laminated body 50 and the second laminated body 60 are joined. In this way, the first laminated body 50 and the second laminated body 60 are bonded by the sealant 17, and the light modulating device 10E shown in FIG. 13 is obtained.

According to the present modification, since the resin layer 56 is provided between the light modulating cell 20 and the film 33, reflection of light at the interface between the light modulating cell 20 and the gap layer F or the interface between the film 33 and the gap layer G, which can occur when the gap layer G is provided between the light modulating cell 20 and the film 33, is reduced. In addition, the resin layer 56 can be provided with low process difficulty.

Sixth Modification of First Embodiment

Figure 14:
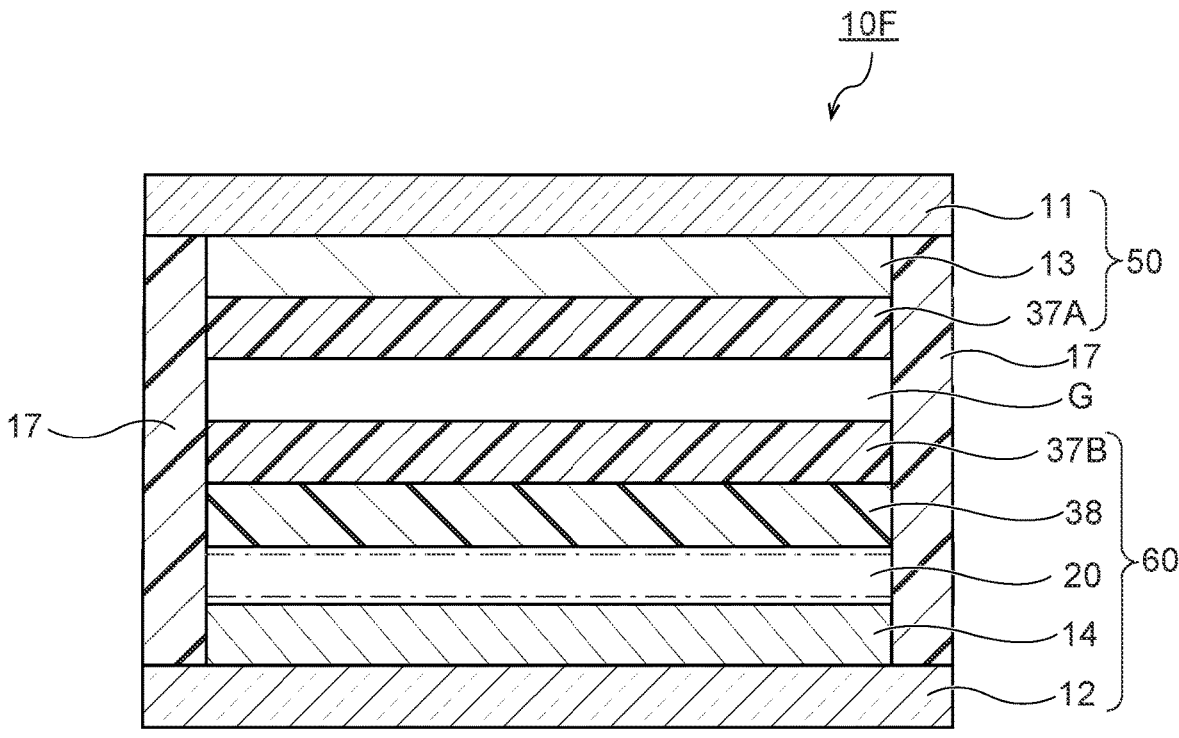
FIG. 14 is a sectional view showing a light modulating device according to a sixth modification of the first embodiment.

FIG. 14 shows a light modulating device 10F according to a sixth modification. In the light modulating device 10F shown in FIG. 14, an optical film 37A is provided in the first laminated body 50 instead of the film 33. In the second laminated body 60, an optical film 37B is provided on the inner-side surface (the surface adjacent to the first glass sheet 11) of the light modulating cell 20 via an optically transparent adhesive film 38. For example, an anti-reflection (AR) film or a moth-eye film may be used as each of the optical films 37A, 37B. Of these, an anti-reflection film is a film that suppresses regular reflection by using interference of reflected light. A moth-eye film has an uneven structure as a structure of reducing reflected light. In the uneven structure, a large number of fine protrusions are regularly arranged at intervals less than or equal to the minimum wavelength of a wavelength range of light for the purpose of preventing reflection. With this configuration, the refractive index for incident light is continuously varied in the thickness direction, and an interface where the refractive index is discontinuous is eliminated, with the result that reflection of light is prevented. The thickness of each of the optical films 37A, 37B may be greater than or equal to 30 μm and less than or equal to 200 μm. For example, an optically transparent adhesive film called OCA (optical clear adhesive film), such as an acrylic pressure-sensitive adhesive, may be used for the optically transparent adhesive film 38. The thickness of the optically transparent adhesive film 38 may be greater than or equal to 50 μm and less than or equal to 300 μm. The optical film 37A or the optical film 37B may be provided in only one of the first laminated body 50 and the second laminated body 60.

When the light modulating device 10F shown in FIG. 14 is prepared, the first laminated body 50 in which the first glass sheet 11, the first interlayer 13, and the optical film 37A are joined with one another is prepared by a lamination process substantially similar to the steps shown in FIG. 6A to FIG. 6C. The second laminated body 60 in which the optical film 37B, the optically transparent adhesive film 38, the light modulating cell 20, the second interlayer 14, and the second glass sheet 12 are joined with one another is prepared by a lamination process substantially similarly to the steps shown in FIG. 6D to FIG. 6F. After that, the sealant 17 is applied to the second glass sheet 12 of the second laminated body 60, and the sealant 17 is brought into close contact with the first glass sheet 11 of the first laminated body 50 and cured, with the result that the first laminated body 50 and the second laminated body 60 are joined. In this way, the first laminated body 50 and the second laminated body 60 are bonded by the sealant 17, and the light modulating device 10F shown in FIG. 14 is obtained.

According to the present modification, the optical films 37A, 37B are provided between the first laminated body 50 and the second laminated body 60, with the result that interface reflection in the light modulating device 10F is reduced. In addition, the optical films 37A, 37B can be provided with low process difficulty.

Second Embodiment

Next, a second embodiment will be described with reference to FIG. 15 to FIG. 20. FIG. 15 to FIG. 20 are views showing the second embodiment. In the second embodiment shown in FIG. 15 to FIG. 20, mainly, a peripheral sealant 18 is used instead of the sealant 17, and the remaining configuration is substantially similar to that of the first embodiment shown in FIG. 1 to FIG. 8. In FIG. 15 to FIG. 20, like reference signs are assigned to the same portions as those of the embodiment shown in FIG. 1 to FIG. 8, and the detailed description is omitted. Hereinafter, the difference from the first embodiment will be mainly described.

Figure 15:
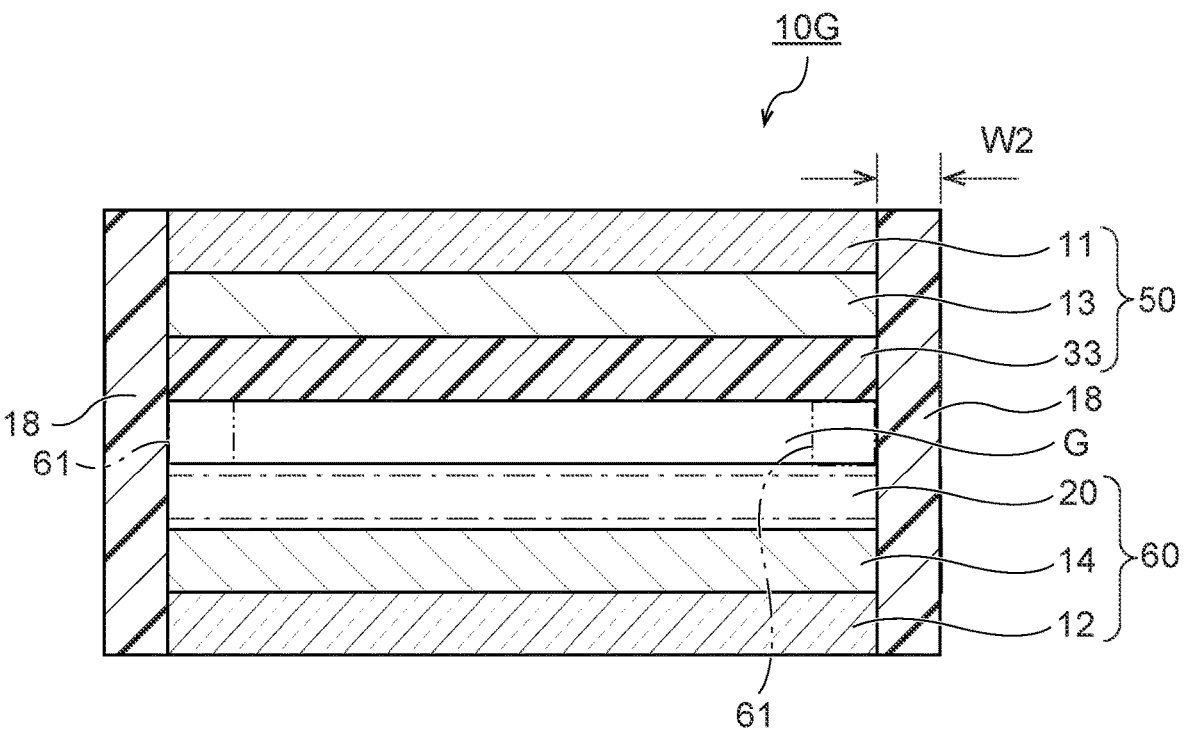
FIG. 15 is a sectional view showing a light modulating device according to a second embodiment.

As shown in FIG. 15, a light modulating device 10G according to the present embodiment includes the first laminated body 50 and the second laminated body 60. In the first laminated body 50, the first glass sheet 11, the first interlayer 13, and the film 33 are laminated. In the second laminated body 60, the second glass sheet 12, the second interlayer 14, and the light modulating cell 20 are laminated. The first laminated body 50 and the second laminated body 60 are bonded by the peripheral sealant 18 located around the first laminated body 50 and the second laminated body 60.

The peripheral sealant 18 is provided along the outer peripheries of the first laminated body 50 and the second laminated body 60. The peripheral sealant 18 has a frame shape or square shape (hollow rectangular shape) in plan view. In this case, the peripheral sealant 18 bonds the first glass sheet 11, the first interlayer 13, the film 33, the light modulating cell 20, the second interlayer 14, and the second glass sheet 12 to one another. With the peripheral sealant 18, the first laminated body 50 and the second laminated body 60 are joined together, and the layers making up the first laminated body 50 and the second laminated body 60 are fixed to one another. The peripheral sealant 18 may be applied after the first laminated body 50 and the second laminated body 60 are stacked. For example, a thermosetting resin or an ultraviolet curing resin, such as epoxy resin and acrylic resin, may be used as the peripheral sealant 18. The same material as that of the sealant 17 may be used for the peripheral sealant 18.

In FIG. 15, the first glass sheet 11, the second glass sheet 12, the first interlayer 13, the second interlayer 14, the film 33, and the light modulating cell 20 may have substantially the same shape in plan view. The peripheral sealant 18 is formed so as to surround the first glass sheet 11, the second glass sheet 12, the first interlayer 13, the second interlayer 14, the film 33, and the light modulating cell 20 in plan view. Thus, entry of moisture or the like from the side of the light modulating device 10 is blocked, with the result that penetration of moisture to the first interlayer 13, the second interlayer 14, and the light modulating cell 20 is suppressed. The width W2 of the peripheral sealant 18 is preferably greater than or equal to about 1 mm and less than or equal to about 10 mm. To ensure the thickness of the gap layer G at the time of applying the peripheral sealant 18, a bank portion 61 (imaginary line) having a predetermined thickness may be provided on the inner side of the periphery of the gap layer G. For example, a UV curing resin material may be used for the bank portion 61.

When the light modulating device 10G shown in FIG. 15 is prepared, the first laminated body 50 in which the first glass sheet 11, the first interlayer 13, and the film 33 are joined with one another is prepared (FIG. 16A) by a lamination process substantially similar to the steps shown in FIG. 6A to FIG. 6C. The second laminated body 60 in which the light modulating cell 20, the second interlayer 14, and the second glass sheet 12 are joined with one another is prepared (FIG. 16B) by a lamination process substantially similar to the steps shown in FIG. 6D to FIG. 6F. Subsequently, the first laminated body 50 and the second laminated body 60 are laminated at a normal pressure (FIG. 16C). After that, the peripheral sealant 18 is applied around the first laminated body 50 and the second laminated body 60 at a normal pressure and cured, with the result that the first laminated body 50 and the second laminated body 60 are joined (FIG. 16D). In this way, the first laminated body 50 and the second laminated body 60 are bonded by the peripheral sealant 18, and the light modulating device 10G shown in FIG. 15 is obtained.

According to the present embodiment, the light modulating device 10G is prepared by bonding the prepared first laminated body 50 and the prepared second laminated body 60 to each other with the peripheral sealant 18. At this time, in the second laminated body 60 prepared by a lamination process, the light modulating cell 20 is exposed outward. Thus, even when there is liquid crystal accumulation (phenomenon in which a large amount of liquid crystal is locally present) in the liquid crystal layer 23 of the light modulating cell 20, the light modulating cell 20 naturally deforms such that the cell gap (the thickness of the liquid crystal layer 23) becomes even at the time when a pressure exerted on the liquid crystal layer 23 is released after the light modulating device 10G is prepared. With this configuration, liquid crystal accumulation of the light modulating cell 20 dissipates, and the liquid crystal layer 23 of the light modulating cell 20 is evenly distributed in the plane, so the quality and appearance of the light modulating device 10G are enhanced. Since liquid crystal accumulation is hard to occur in the light modulating cell 20, it is easy to reduce the thickness of each of the first interlayer 13 and the second interlayer 14.

According to the present embodiment, a glass lamination process is not performed in a state where the light modulating cell 20 and the film 33 are stacked on top of each other. Therefore, to maintain the thickness (gap) of the gap layer G between the light modulating cell 20 and the film 33, no spacer or the like needs to be placed between the film 33 and the first substrate 24. Hence, the shape of the spacer placed between the film 33 and the first substrate 24 is transferred to the light modulating cell 20 at the time of a glass lamination process, and there is no concern about an occurrence of asperities on the light modulating cell 20.

Modifications of Second Embodiment

Next, various modifications of the present embodiment will be described with reference to FIG. 17 to FIG. 20. FIG. 17 to FIG. 20 are views respectively showing light modulating devices according to the modifications of the present embodiment. In FIG. 17 to FIG. 20, like reference signs are assigned to the same portions as those of the embodiment shown in FIG. 1 to FIG. 16, and the detailed description is omitted.

First Modification of Second Embodiment

Figure 17:
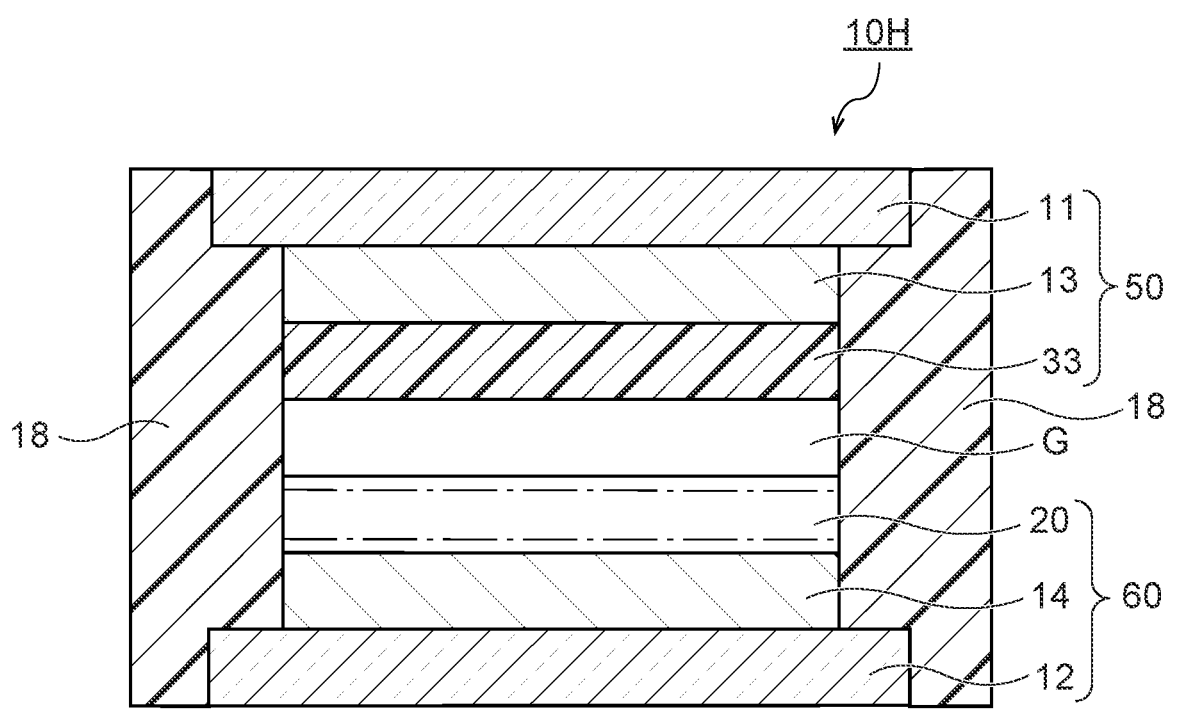
FIG. 17 is a sectional view showing a light modulating device according to a first modification of the second embodiment.

FIG. 17 shows a light modulating device 10H according to a first modification of the present embodiment. In the light modulating device 10H shown in FIG. 17, the peripheral sealant 18 is provided not only around the first laminated body 50 and the second laminated body 60 but also between the first glass sheet 11 of the first laminated body 50 and the second glass sheet 12 of the second laminated body 60. In this case, the peripheral sealant 18 bonds the inner-side surface (the surface adjacent to the second glass sheet 12) of the first glass sheet 11 and the inner-side surface (the surface adjacent to the first glass sheet 11) of the second glass sheet 12. Each of the first glass sheet 11 and the second glass sheet 12 is larger in plan view than each of the first interlayer 13, the film 33, the light modulating cell 20, and the second interlayer 14.

When the light modulating device 10H shown in FIG. 17 is prepared, the first laminated body 50 and the second laminated body 60 each are initially prepared by a lamination process substantially similar to the steps shown in FIG. 13A and FIG. 13B. Subsequently, the first laminated body 50 and the second laminated body 60 are stacked substantially similarly to the step shown in FIG. 16C. After that, the peripheral sealant 18 is applied to not only around the first laminated body 50 and the second laminated body 60 but also between the first glass sheet 11 and the second glass sheet 12 and cured, with the result that the first laminated body 50 and the second laminated body 60 are joined. In this way, the first laminated body 50 and the second laminated body 60 are bonded by the peripheral sealant 18, and the light modulating device 10H shown in FIG. 17 is obtained.

According to the present modification, entry of moisture or the like from the side of the light modulating device 10H is blocked, with the result that penetration of moisture to the first interlayer 13, the light modulating cell 20, and second interlayer 14 is suppressed. When the peripheral sealant 18 bonds the glass sheets to each other, strong adhesion is obtained.

Second Modification of Second Embodiment

Figure 18:
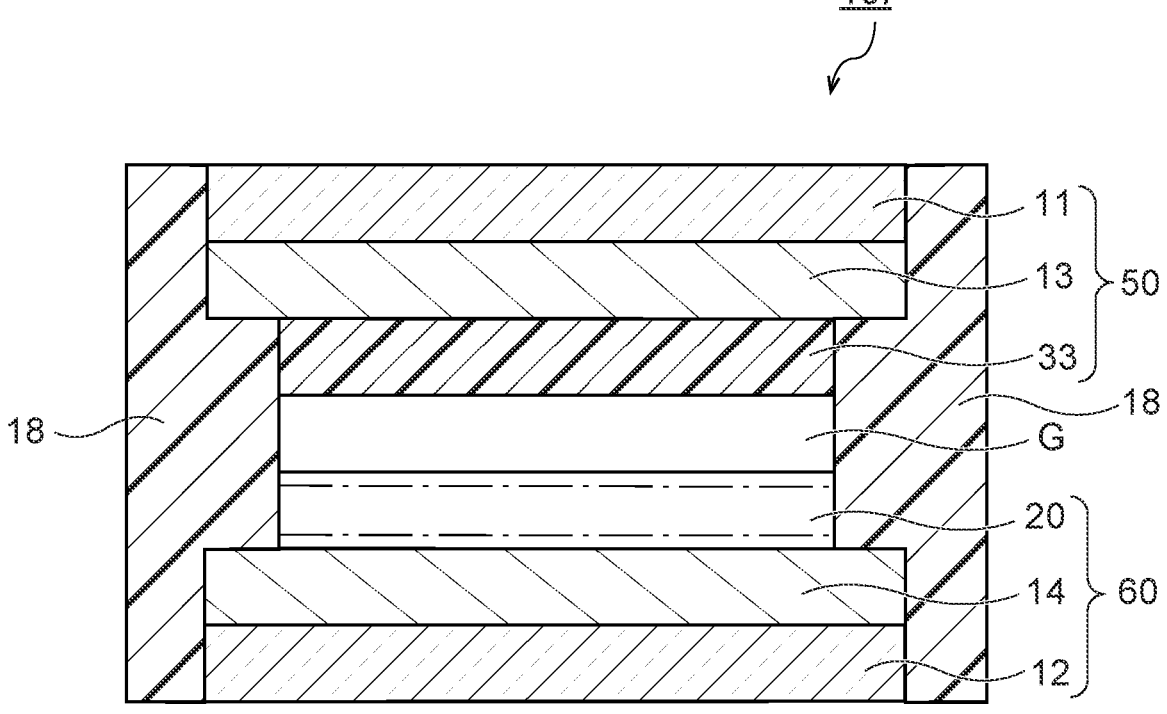
FIG. 18 is a sectional view showing a light modulating device according to a second modification of the second embodiment.

FIG. 18 shows a light modulating device 10I according to a second modification of the present embodiment. In the light modulating device 10I shown in FIG. 18, the peripheral sealant 18 is provided not only around the first laminated body 50 and the second laminated body 60 but also between the first interlayer 13 of the first laminated body 50 and the second interlayer 14 of the second laminated body 60. In this case, the peripheral sealant 18 bonds the inner-side surface (the surface adjacent to the second glass sheet 12) of the first interlayer 13 and the inner-side surface (the surface adjacent to the first glass sheet 11) of the second interlayer 14. Each of the first glass sheet 11, the first interlayer 13, the second interlayer 14, and the second glass sheet 12 is larger in plan view than each of the film 33 and the light modulating cell 20.

Figure 16A:
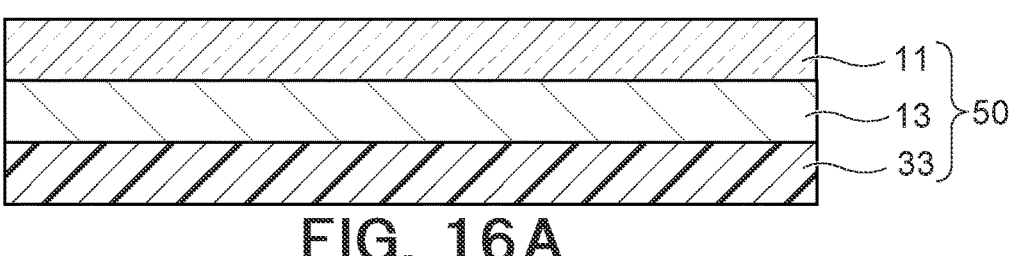
FIG. 16A to FIG. 16D are sectional views showing a manufacturing method for the light modulating device according to the second embodiment.
Figure 16B:
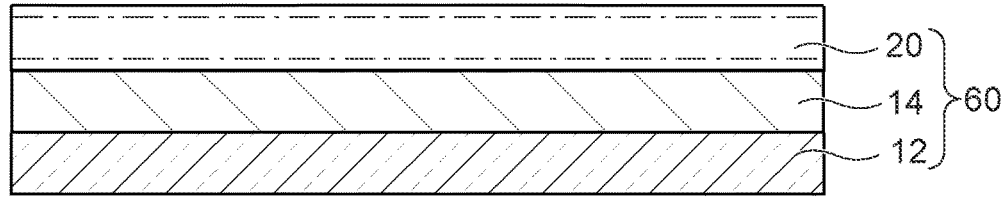
Figure 16C:
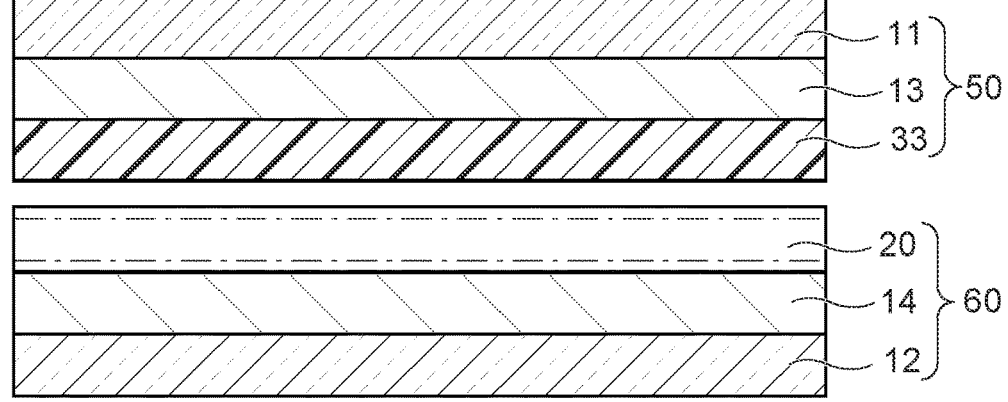
Figure 16D:
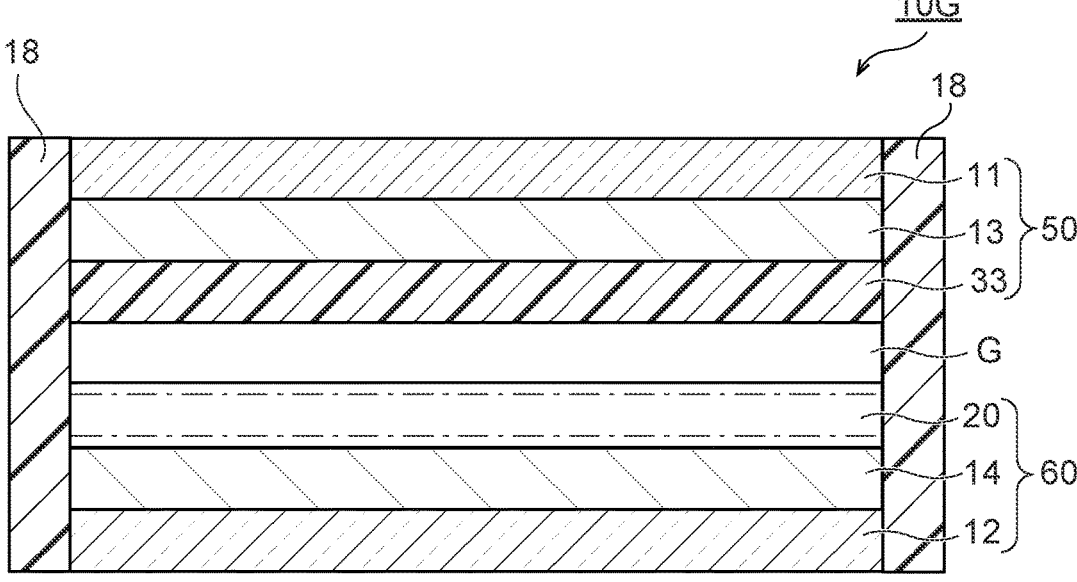

When the light modulating device 10I shown in FIG. 18 is prepared, the first laminated body 50 and the second laminated body 60 each are initially prepared by a lamination process substantially similar to the steps shown in FIG. 16A and FIG. 16B. Subsequently, the first laminated body 50 and the second laminated body 60 are stacked substantially similarly to the step shown in FIG. 16C. After that, the peripheral sealant 18 is applied to not only around the first laminated body 50 and the second laminated body 60 but also between the first interlayer 13 and the second interlayer 14 and cured, with the result that the first laminated body 50 and the second laminated body 60 are joined. In this way, the first laminated body 50 and the second laminated body 60 are bonded by the peripheral sealant 18, and the light modulating device 10I shown in FIG. 18 is obtained.

According to the present modification, entry of moisture or the like from the side of the light modulating device 10H is blocked, with the result that penetration of moisture to the first interlayer 13, the light modulating cell 20, and the second interlayer 14 is suppressed.

Third Modification of Second Embodiment

Figure 19:
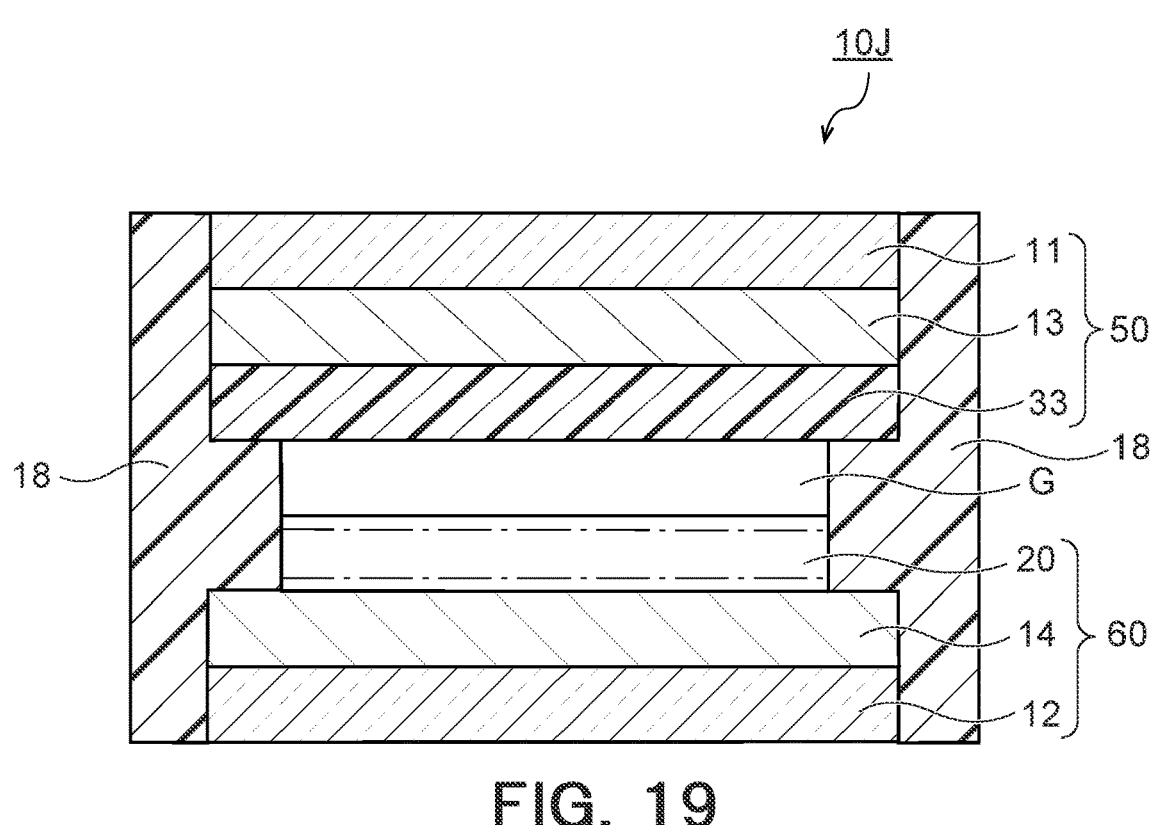
FIG. 19 is a sectional view showing a light modulating device according to a third modification of the second embodiment.

FIG. 19 shows a light modulating device 10J according to a third modification of the present embodiment. In the light modulating device 10J shown in FIG. 19, the peripheral sealant 18 is provided not only around the first laminated body 50 and the second laminated body 60 but also between the film 33 of the first laminated body 50 and the second interlayer 14 of the second laminated body 60. In this case, the peripheral sealant 18 bonds the inner-side surface (the surface adjacent to the second glass sheet 12) of the film 33 and the inner-side surface (the surface adjacent to the first glass sheet 11) of the second interlayer 14. Each of the first glass sheet 11, the first interlayer 13, the film 33, the second interlayer 14, and the second glass sheet 12 is larger in plan view than the light modulating cell 20.

When the light modulating device 10J shown in FIG. 19 is prepared, the first laminated body 50 and the second laminated body 60 each are initially prepared by a lamination process substantially similar to the steps shown in FIG. 16A and FIG. 16B. Subsequently, the first laminated body 50 and the second laminated body 60 are stacked substantially similarly to the step shown in FIG. 16C. After that, the peripheral sealant 18 is applied to not only around the first laminated body 50 and the second laminated body 60 but also between the film 33 and the second interlayer 14 and cured, with the result that the first laminated body 50 and the second laminated body 60 are joined. In this way, the first laminated body 50 and the second laminated body 60 are bonded by the peripheral sealant 18, and the light modulating device 10J shown in FIG. 19 is obtained.

According to the present modification, entry of moisture or the like from the side of the light modulating device 10J is blocked, with the result that penetration of moisture to the first interlayer 13, the light modulating cell 20, and the second interlayer 14 is suppressed.

Fourth Modification of Second Embodiment

Figure 20:
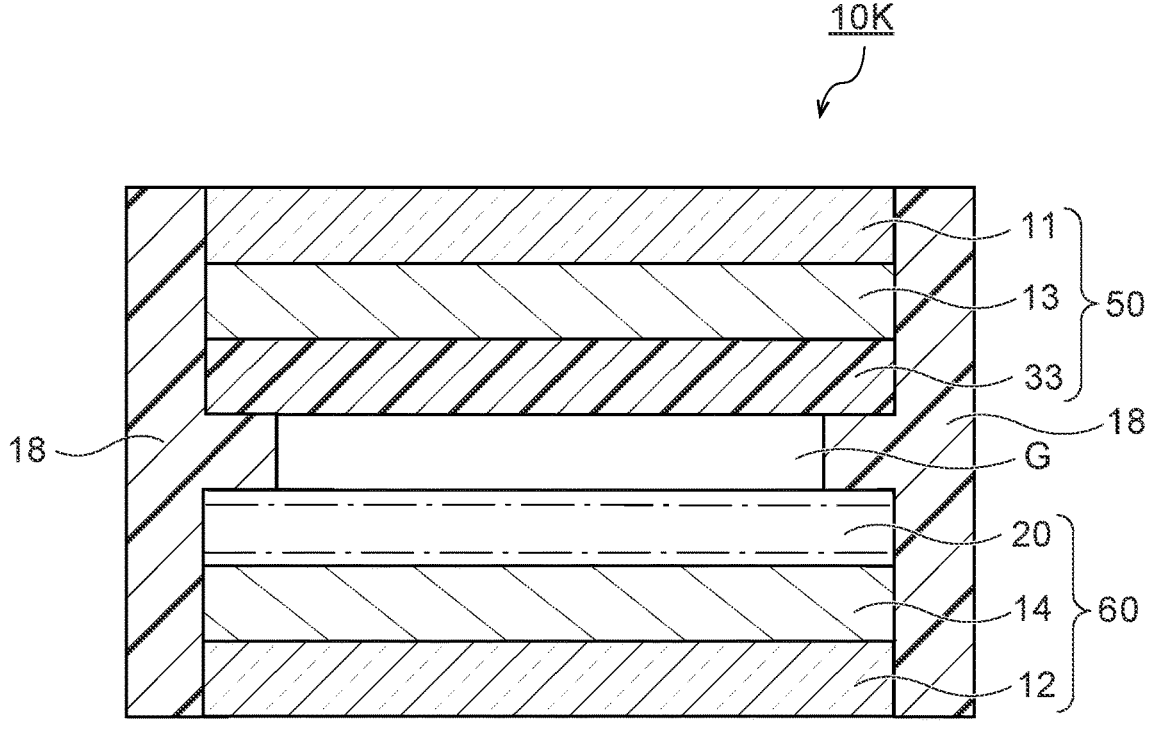
FIG. 20 is a sectional view showing a light modulating device according to a fourth modification of the second embodiment.

FIG. 20 shows a light modulating device 10K according to a fourth modification of the present embodiment. In the light modulating device 10K shown in FIG. 20, the peripheral sealant 18 is provided not only around the first laminated body 50 and the second laminated body 60 but also between the film 33 of the first laminated body 50 and the light modulating cell 20 of the second laminated body 60. In this case, the peripheral sealant 18 bonds the inner-side surface (the surface adjacent to the second glass sheet 12) of the film 33 and the inner-side surface (the surface adjacent to the first glass sheet 11) of the light modulating cell 20. The first glass sheet 11, the first interlayer 13, the film 33, the light modulating cell 20, the second interlayer 14, and the second glass sheet 12 have substantially the same shape in plan view.

When the light modulating device 10K shown in FIG. 20 is prepared, the first laminated body 50 and the second laminated body 60 each are initially prepared by a lamination process substantially similar to the steps shown in FIG. 16A and FIG. 16B. Subsequently, the first laminated body 50 and the second laminated body 60 are stacked substantially similarly to the step shown in FIG. 16C. After that, the peripheral sealant 18 is applied to not only around the first laminated body 50 and the second laminated body 60 but also between the film 33 and the light modulating cell 20 and cured, with the result that the first laminated body 50 and the second laminated body 60 are joined. In this way, the first laminated body 50 and the second laminated body 60 are bonded by the peripheral sealant 18, and the light modulating device 10K shown in FIG. 20 is obtained.

According to the present modification, entry of moisture or the like from the side of the light modulating device 10K is blocked, with the result that penetration of moisture to the first interlayer 13, the light modulating cell 20, and the second interlayer 14 is suppressed.

Third Embodiment

Next, a third embodiment will be described with reference to FIG. 21 to FIG. 24. FIG. 21 to FIG. 24 are views showing the third embodiment. In the third embodiment shown in FIG. 21 to FIG. 24, mainly, an optically transparent adhesive film 57 is used instead of the sealant 17, and the remaining configuration is substantially similar to that of the first embodiment shown in FIG. 1 to FIG. 8. In FIG. 21 to FIG. 24, like reference signs are assigned to the same portions as those of the embodiment shown in FIG. 1 to FIG. 8, and the detailed description is omitted. Hereinafter, the difference from the first embodiment will be mainly described.

Figure 21:
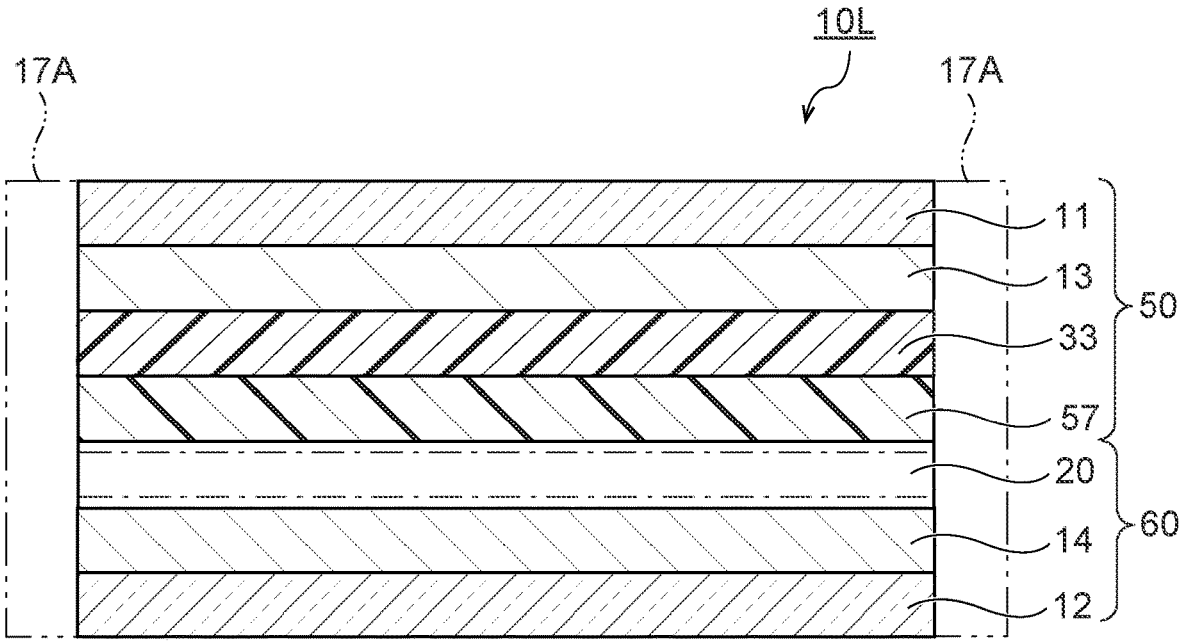
FIG. 21 is a sectional view showing a light modulating device according to a third embodiment.

As shown in FIG. 21, a light modulating device 10L according to the present embodiment includes the first laminated body 50 and the second laminated body 60. In the first laminated body 50, the first glass sheet 11, the first interlayer 13, the film 33, and the optically transparent adhesive film 57 are laminated. In the second laminated body 60, the second glass sheet 12, the second interlayer 14, and the light modulating cell 20 are laminated. The first laminated body 50 and the second laminated body 60 are bonded by the optically transparent adhesive film 57 of the first laminated body 50.

The optically transparent adhesive film 57 is provided on the inner surface side (adjacent to the second glass sheet 12) of the film 33. With the optically transparent adhesive film 57, the first laminated body 50 and the second laminated body 60 are joined together, and the layers making up the first laminated body 50 and the second laminated body 60 are fixed to one another. In this way, when the optically transparent adhesive film 57 bonds the first laminated body 50 and the second laminated body 60, a seal coating step is not needed. For example, an optically transparent adhesive film called OCA, such as an acrylic pressure-sensitive adhesive, may be used for the optically transparent adhesive film 57. The optically transparent adhesive film 57 can be made up of only a pressure-sensitive adhesive with a substantially constant film thickness without including a substrate. The optically transparent adhesive film 57 is manufactured by sandwiching the pressure-sensitive adhesive with a separator (separating material) 58 (see FIG. 22A) having high releasability, a laminated body of the pressure-sensitive adhesive and the separator 58 is cut into a desired shape, and the separator 58 is removed. As a result, the optically transparent adhesive film 57 can be stuck to a desired portion. For example, an acrylic, silicon, or urethane pressure-sensitive adhesive may be used as the pressure-sensitive adhesive of the optically transparent adhesive film 57.

In FIG. 21, the first glass sheet 11, the first interlayer 13, the film 33, the optically transparent adhesive film 57, the light modulating cell 20, the second interlayer 14, and the second glass sheet 12 may have substantially the same shape in plan view. The thickness of the optically transparent adhesive film 57 may be greater than or equal to about 50 μm and less than or equal to about 300 μm. In FIG. 21, the sealant 17A (imaginary line) may be provided around the first laminated body 50 and the second laminated body 60. In this case, penetration of moisture to the first interlayer 13, the light modulating cell 20, and the second interlayer 14 is suppressed. In the present embodiment, an example in which the optically transparent adhesive film 57 is included in the first laminated body 50 is described; however, the optically transparent adhesive film 57 may be included in the second laminated body 60. In this case, the optically transparent adhesive film 57 may be provided on the inner surface (the surface adjacent to the second glass sheet 12) of the light modulating cell 20.

When the light modulating device 10L shown in FIG. 21 is prepared, the first laminated body 50 in which the first glass sheet 11, the first interlayer 13, the film 33, and the optically transparent adhesive film 57 are joined with one another is initially prepared (FIG. 22A) by a lamination process substantially similar to the steps shown in FIG. 6A to FIG. 6C. At this time, the separator (separating material) 58 is provided on the surface of the optically transparent adhesive film 57 on the side opposite from the film 33. The second laminated body 60 in which the light modulating cell 20, the second interlayer 14, and the second glass sheet 12 are joined with one another is prepared (FIG. 22B) by a lamination process substantially similarly to the steps shown in FIG. 6D to FIG. 6F. Subsequently, the separator 58 is released, and the first laminated body 50 and the second laminated body 60 are laminated (FIG. 22C). After that, the first laminated body 50 and the second laminated body 60 are joined by laminating the first laminated body 50 and the second laminated body 60 in a vacuum state with a vacuum laminating machine (not shown) (FIG. 22D). In this way, the first laminated body 50 and the second laminated body 60 are bonded by the optically transparent adhesive film 57, and the light modulating device 10L shown in FIG. 21 is obtained.

According to the present embodiment, the light modulating device 10L is prepared by bonding the prepared first laminated body 50 and the prepared second laminated body 60 to each other with the optically transparent adhesive film 57. At this time, in the second laminated body 60 prepared by a lamination process, the light modulating cell 20 is exposed outward. Thus, even when there is liquid crystal accumulation (phenomenon in which a large amount of liquid crystal is locally present) in the liquid crystal layer 23 of the light modulating cell 20, the light modulating cell 20 naturally deforms such that the cell gap (the thickness of the liquid crystal layer 23) becomes even at the time when a pressure exerted on the liquid crystal layer 23 is released after the light modulating device 10L is prepared. With this configuration, liquid crystal accumulation in the light modulating cell 20 dissipates, and the liquid crystal layer 23 of the light modulating cell 20 is evenly distributed in the plane, so the quality and appearance of the light modulating device 10L are enhanced. Since liquid crystal accumulation is hard to occur in the light modulating cell 20, it is easy to reduce the thickness of each of the first interlayer 13 and the second interlayer 14.

According to the present embodiment, a glass lamination process is not performed in a state where the light modulating cell 20 and the film 33 are stacked on top of each other. Therefore, to maintain the thickness (gap) of the gap layer G between the light modulating cell 20 and the film 33, no spacer or the like needs to be placed between the film 33 and the first substrate 24. Hence, the shape of the spacer placed between the film 33 and the first substrate 24 is transferred to the light modulating cell 20 at the time of a glass lamination process, and there is no concern about an occurrence of asperities on the light modulating cell 20.

Modifications of Third Embodiment

Next, various modifications of the present embodiment will be described with reference to FIG. 23 and FIG. 24. FIG. 23 and FIG. 24 are views respectively showing light modulating devices according to the modifications of the present embodiment. In FIG. 23 and FIG. 24, like reference signs are assigned to the same portions as those of the embodiments shown in FIG. 1 to FIG. 22, and the detailed description is omitted.

First Modification of Third Embodiment

FIG. 23 shows a light modulating device 10M according to a first modification of the present embodiment. In the light modulating device 10M shown in FIG. 23, the film 33 is not provided, and the first interlayer 13 is located between the first glass sheet 11 and the optically transparent adhesive film 57. In this case, the optically transparent adhesive film 57 bonds the inner-side surface (the surface adjacent to the second glass sheet 12) of the first interlayer 13 and the inner-side surface (the surface adjacent to the first glass sheet 11) of the light modulating cell 20.

Figure 22A:
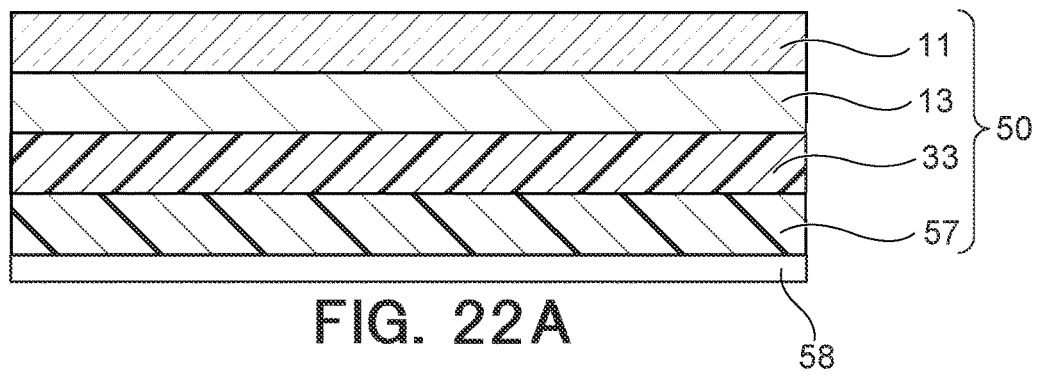
FIG. 22A to FIG. 22D are sectional views showing a manufacturing method for the light modulating device according to the third embodiment.
Figure 22B:
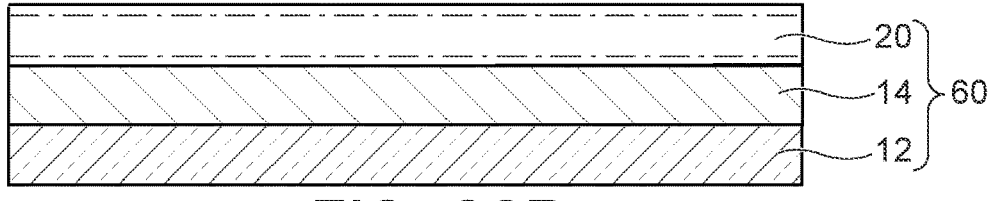
Figure 22C:
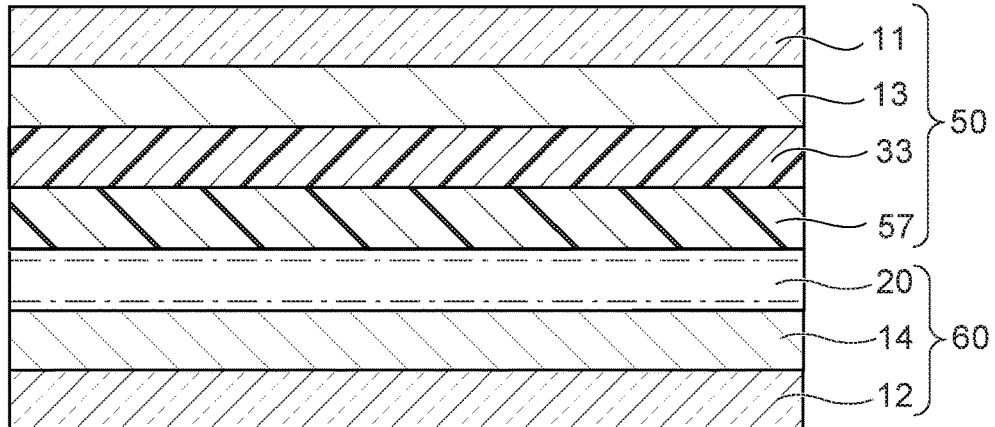
Figure 22D:
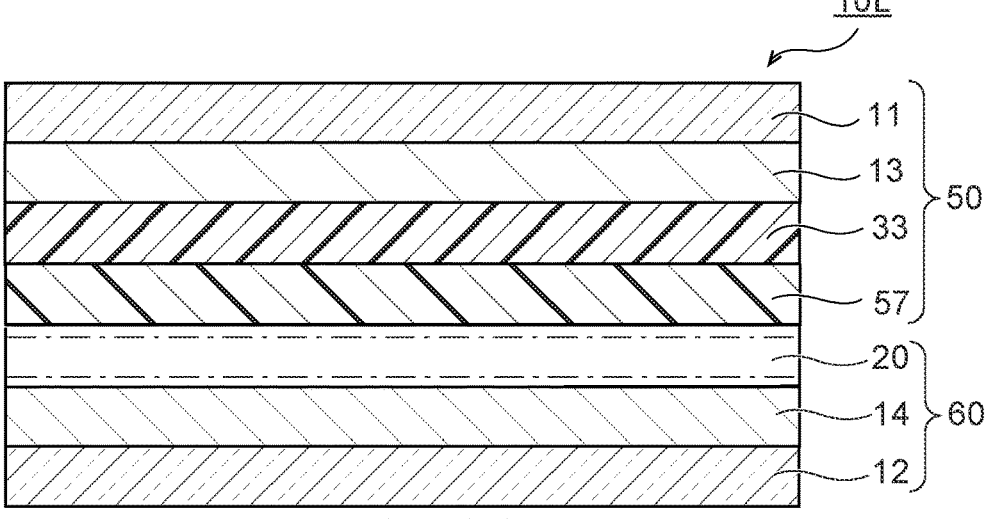
Figure 23:
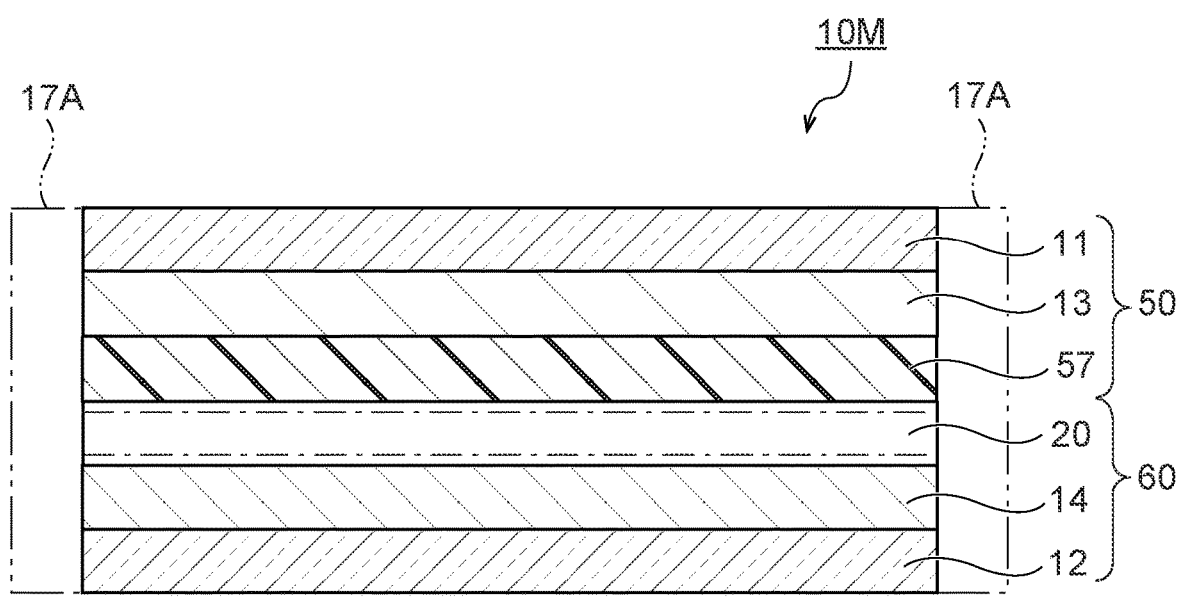
FIG. 23 is a sectional view showing a light modulating device according to a first modification of the third embodiment.
Figure 24:
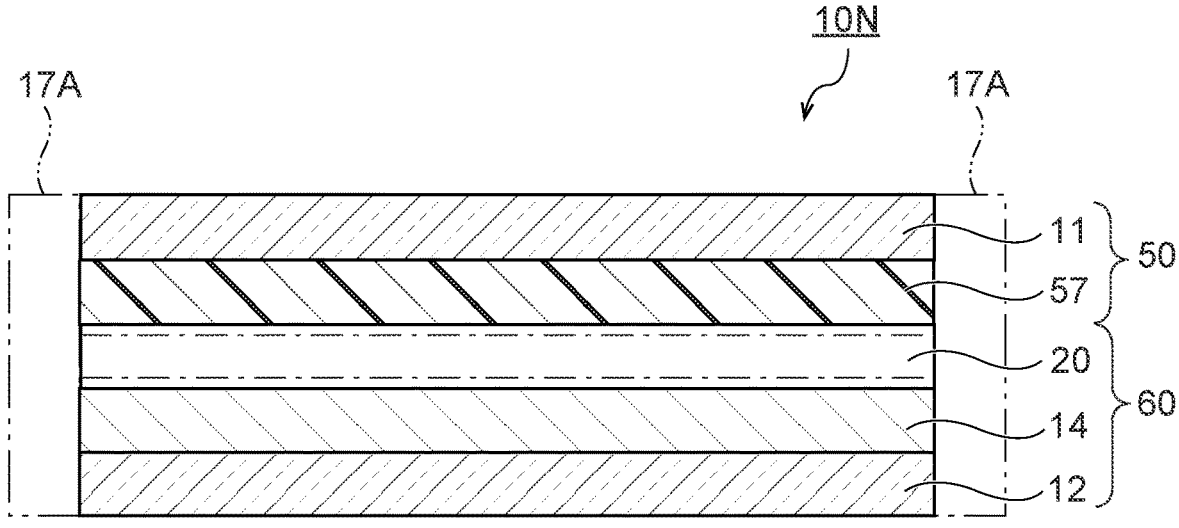
FIG. 24 is a sectional view showing a light modulating device according to a second modification of the third embodiment.

When the light modulating device 10M shown in FIG. 23 is prepared, the first laminated body 50 and the second laminated body 60 each are initially prepared by a lamination process substantially similar to the steps shown in FIG. 22A and FIG. 22B. Subsequently, the separator 58 is released and the first laminated body 50 and the second laminated body 60 are stacked substantially similarly to the step shown in FIG. 22C. After that, the first laminated body 50 and the second laminated body 60 are joined by laminating the first laminated body 50 and the second laminated body 60 in a vacuum state with a vacuum laminating machine (not shown). In this way, the first laminated body 50 and the second laminated body 60 are bonded by the optically transparent adhesive film 57, and the light modulating device 10M shown in FIG. 23 is obtained.

According to the present modification, since the film 33 is not provided, the layer configuration of the light modulating device 10M is simplified. In the step of preparing the first laminated body 50 in process of creating the light modulating device 10M, the first interlayer 13 is not exposed outward, and the optically transparent adhesive film 57 is laminated on the first interlayer 13. Therefore, degradation of the first interlayer 13 due to moisture is suppressed, and the surface (adjacent to the second laminated body 60) of the first interlayer 13 is made flat. In FIG. 23, the sealant 17A (imaginary line) may be provided around the first laminated body 50 and the second laminated body 60.

Second Modification of Third Embodiment

FIG. 24 shows a light modulating device 10N according to a second modification of the present embodiment. In the light modulating device 10N shown in FIG. 24, the film 33 and the first interlayer 13 are not provided, and the optically transparent adhesive film 57 is located between the first glass sheet 11 and the light modulating cell 20. In this case, the optically transparent adhesive film 57 bonds the inner-side surface (the surface adjacent to the second glass sheet 12) of the first glass sheet 11 and the inner-side surface (the surface adjacent to the first glass sheet 11) of the light modulating cell 20.

When the light modulating device 10N shown in FIG. 24 is prepared, the first laminated body 50 and the second laminated body 60 each are initially prepared by a lamination process substantially similar to the steps shown in FIG. 22A and FIG. 22B. Subsequently, the separator 58 is released and the first laminated body 50 and the second laminated body 60 are stacked substantially similarly to the step shown in FIG. 22C. After that, the first laminated body 50 and the second laminated body 60 are joined by laminating the first laminated body 50 and the second laminated body 60 in a vacuum state with a vacuum laminating machine (not shown). In this way, the first laminated body 50 and the second laminated body 60 are bonded by the optically transparent adhesive film 57, and the light modulating device 10N shown in FIG. 24 is obtained.

According to the present modification, since the film 33 and the first interlayer 13 are not provided, the layer configuration of the light modulating device 10N is simplified. In FIG. 24, the sealant 17A (imaginary line) may be provided around the first laminated body 50 and the second laminated body 60.

Fourth Embodiment

Next, a fourth embodiment will be described with reference to FIG. 25 to FIG. 28. FIG. 25 to FIG. 28 are views showing the fourth embodiment. In the fourth embodiment shown in FIG. 25 to FIG. 28, mainly, a thermally adhesive resin layer 63 is used instead of the sealant 17, and the remaining configuration is substantially similar to that of the first embodiment shown in FIG. 1 to FIG. 8. In FIG. 25 to FIG. 28, like reference signs are assigned to the same portions as those of the embodiment shown in FIG. 1 to FIG. 8, and the detailed description is omitted. Hereinafter, the difference from the first embodiment will be mainly described.

Figure 25:
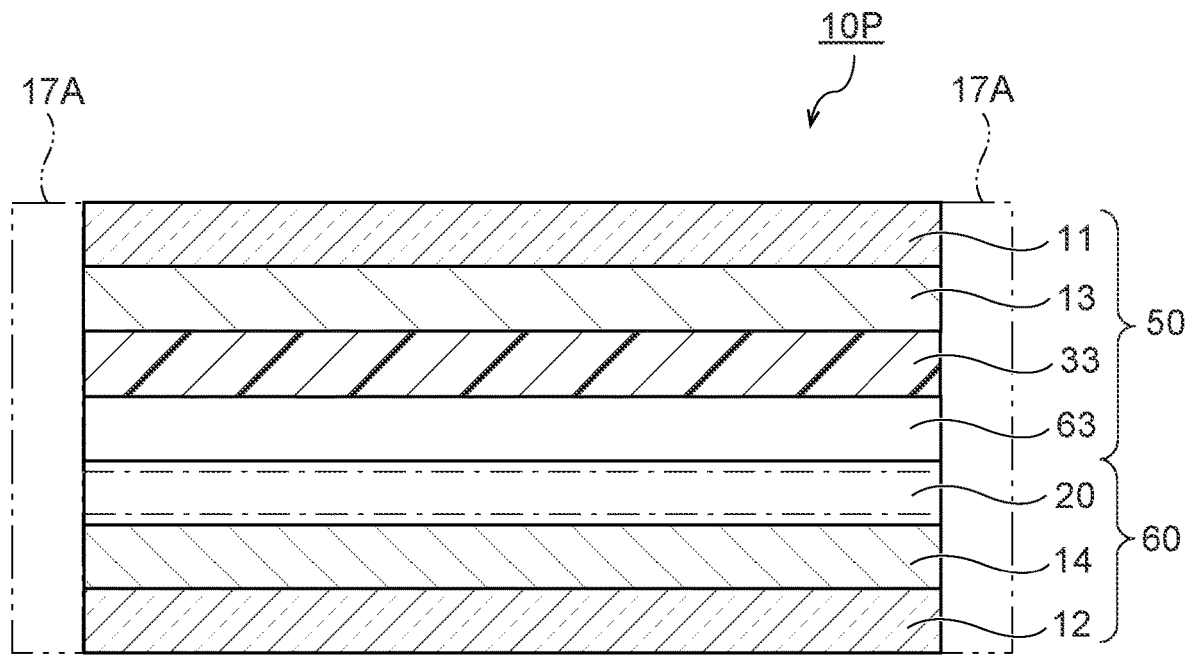
FIG. 25 is a sectional view showing a light modulating device according to a fourth embodiment.

As shown in FIG. 25, a light modulating device 10P according to the present embodiment includes the first laminated body 50 and the second laminated body 60. In the first laminated body 50, the first glass sheet 11, the first interlayer 13, the film 33, and the thermally adhesive resin layer 63 are laminated. In the second laminated body 60, the second glass sheet 12, the second interlayer 14, and the light modulating cell 20 are laminated. The first laminated body 50 and the second laminated body 60 are bonded by the thermally adhesive resin layer 63 of the first laminated body 50.

The thermally adhesive resin layer 63 is provided on the inner surface side (adjacent to the second glass sheet 12) of the film 33. With the thermally adhesive resin layer 63, the first laminated body 50 and the second laminated body 60 are joined together, and the layers making up the first laminated body 50 and the second laminated body 60 are fixed to one another. In this way, when the thermally adhesive resin layer 63 bonds the first laminated body 50 and the second laminated body 60, a seal coating step is not needed. The thermally adhesive resin layer 63 is made of a transparent resin material having a melting point of lower than or equal to 100° C. and preferably higher than or equal to 80° C. and lower than or equal to 90° C. For example, a thermally adhesive ethylene-vinyl acetate copolymer resin (produced by Tosoh Corporation, Product name: MELT- HENE G (registered trademark)) may be used as the material of the thermally adhesive resin layer 63.

In FIG. 25, the first glass sheet 11, the first interlayer 13, the film 33, the thermally adhesive resin layer 63, the light modulating cell 20, the second interlayer 14, and the second glass sheet 12 may have substantially the same shape in plan view. The thickness of the thermally adhesive resin layer 63 is preferably greater than or equal to about 150 µm and less than or equal to about 400 µm. In FIG. 25, the sealant 17A (imaginary line) may be provided around the first laminated body 50 and the second laminated body 60. In this case, penetration of moisture to the first interlayer 13, the light modulating cell 20, and the second interlayer 14 is suppressed. In the present embodiment, an example in which the thermally adhesive resin layer 63 is included in the first laminated body 50 is described; however, the thermally adhesive resin layer 63 may be included in the second laminated body 60. In this case, the thermally adhesive resin layer 63 may be provided on the inner surface (adjacent to the second glass sheet 12) of the light modulating cell 20.

When the light modulating device 10P shown in FIG. 25 is prepared, the first laminated body 50 in which the first glass sheet 11, the first interlayer 13, the film 33, and the thermally adhesive resin layer 63 are joined with one another is prepared (FIG. 26A) by a lamination process substantially similar to the steps shown in FIG. 6A to FIG. 6C. The second laminated body 60 in which the light modulating cell 20, the second interlayer 14, and the second glass sheet 12 are joined with one another is prepared (FIG. 26B) by a lamination process substantially similar to the steps shown in FIG. 6D to FIG. 6F. Subsequently, the first laminated body 50 and the second laminated body 60 are laminated (FIG. 26C). After that, the first laminated body 50 and the second laminated body 60 are laminated in a vacuum state with a vacuum bag (not shown), and, subsequently, the first laminated body 50 and the second laminated body 60 are heated to a temperature higher than or equal to the melting point (for example, 100° C.) of the thermally adhesive resin layer 63. With this configuration, the thermally adhesive resin layer 63 melts, and the first laminated body 50 and the second laminated body 60 are joined (FIG. 26D). In this way, the first laminated body 50 and the second laminated body 60 are bonded by the thermally adhesive resin layer 63, and the light modulating device 10P shown in FIG. 25 is obtained.

According to the present embodiment, the light modulating device 10P is prepared by bonding the prepared first laminated body 50 and the prepared second laminated body 60 to each other with the thermally adhesive resin layer 63. At this time, in the second laminated body 60 prepared by a lamination process, the light modulating cell 20 is exposed outward. Thus, even when there is liquid crystal accumulation (phenomenon in which a large amount of liquid crystal is locally present) in the liquid crystal layer 23 of the light modulating cell 20, the light modulating cell 20 naturally deforms such that the cell gap (the thickness of the liquid crystal layer 23) becomes even at the time when a pressure exerted on the liquid crystal layer 23 is released after the light modulating device 10P is prepared. With this configuration, liquid crystal accumulation in the light modulating cell 20 dissipates, and the liquid crystal layer 23 of the light modulating cell 20 is evenly distributed in the plane, so the quality and appearance of the light modulating device 10P are enhanced. Since liquid crystal accumulation is hard to occur in the light modulating cell 20, it is easy to reduce the thickness of each of the first interlayer 13 and the second interlayer 14.

According to the present embodiment, a glass lamination process is not performed in a state where the light modulating cell 20 and the film 33 are stacked on top of each other. Therefore, to maintain the thickness (gap) of the gap layer G between the light modulating cell 20 and the film 33, no spacer or the like needs to be placed between the film 33 and the first substrate 24. Hence, the shape of the spacer placed between the film 33 and the first substrate 24 is transferred to the light modulating cell 20 at the time of a glass lamination process, and there is no concern about an occurrence of asperities on the light modulating cell 20.

Modifications of Fourth Embodiment

Next, various modifications of the present embodiment will be described with reference to FIG. 27 and FIG. 28. FIG. 27 and FIG. 28 are views respectively showing light modulating devices according to the modifications of the present embodiment. In FIG. 27 and FIG. 28, like reference signs are assigned to the same portions as those of the embodiment shown in FIG. 1 to FIG. 26, and the detailed description is omitted.

First Modification of Fourth Embodiment

FIG. 27 shows a light modulating device 10Q according to a first modification of the present embodiment. In the light modulating device 10Q shown in FIG. 27, the film 33 is not provided, and the first interlayer 13 is located between the first glass sheet 11 and the thermally adhesive resin layer 63. In this case, the thermally adhesive resin layer 63 bonds the inner-side surface (the surface adjacent to the second glass sheet 12) of the first interlayer 13 and the inner-side surface (the surface adjacent to the first glass sheet 11) of the light modulating cell 20.

Figure 26A:
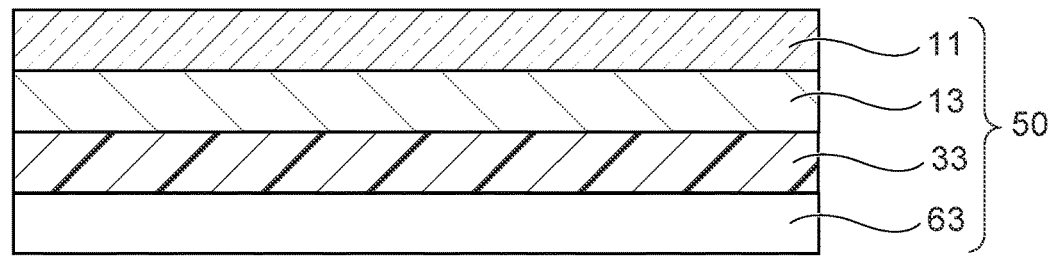
FIG. 26A to FIG. 26D are sectional views showing a manufacturing method for the light modulating device according to the fourth embodiment.
Figure 26B:
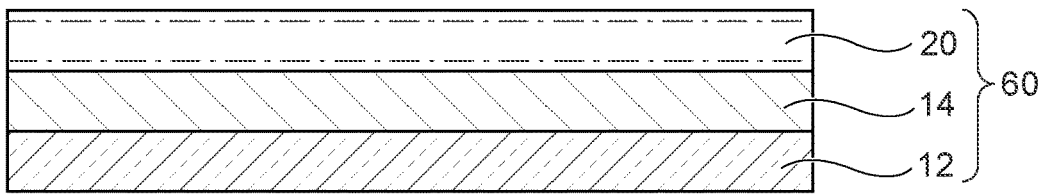
Figure 26C:
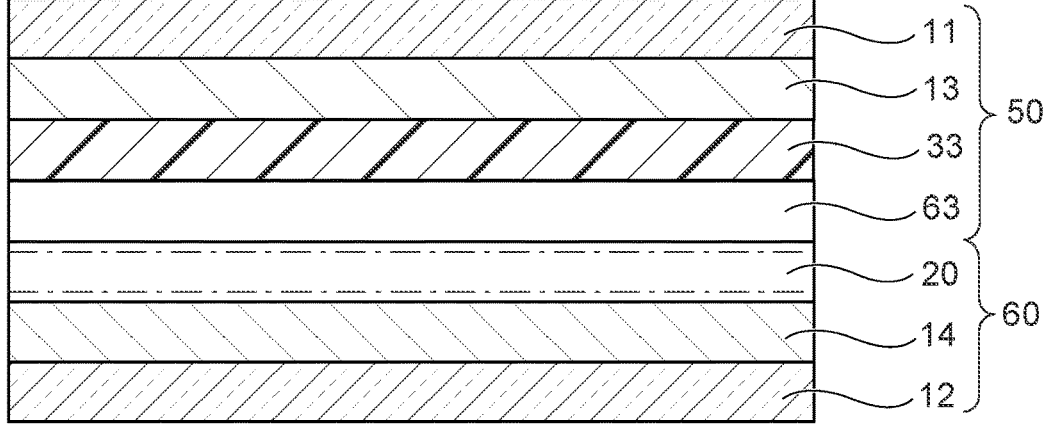
Figure 26D:
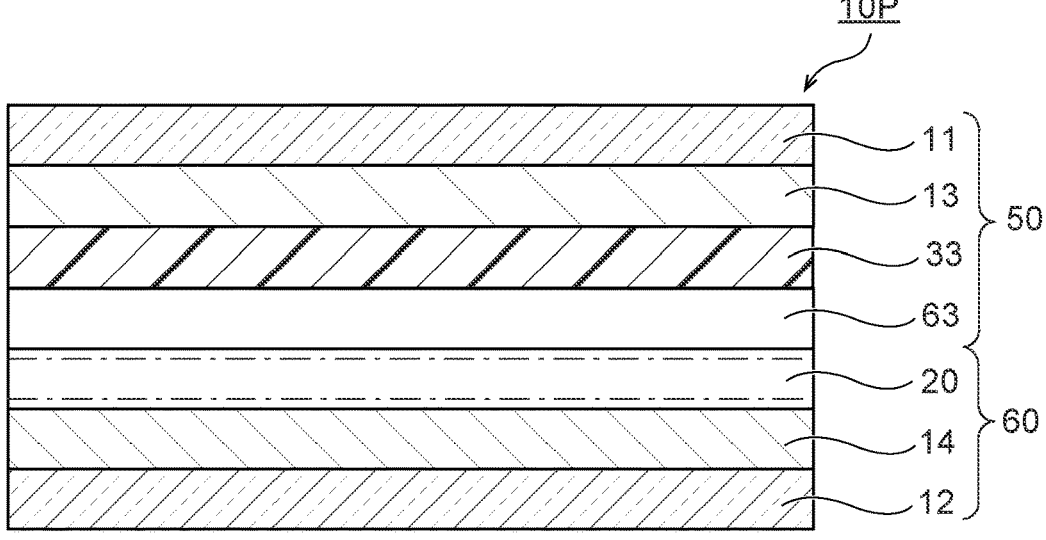
Figure 27:
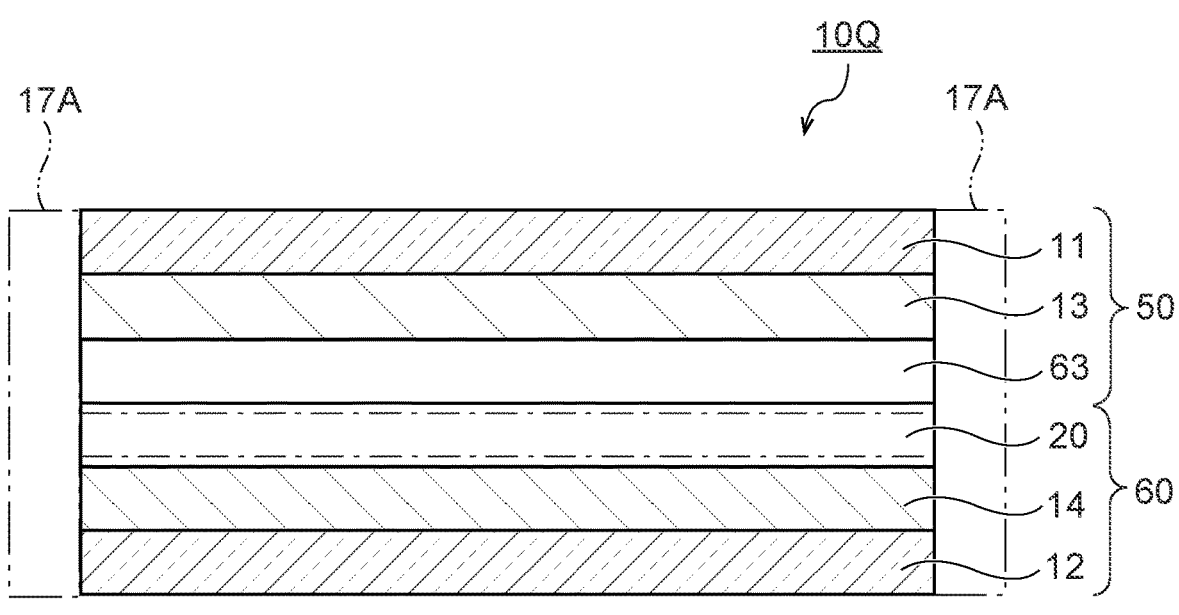
FIG. 27 is a sectional view showing a light modulating device according to a first modification of the fourth embodiment.
Figure 28:
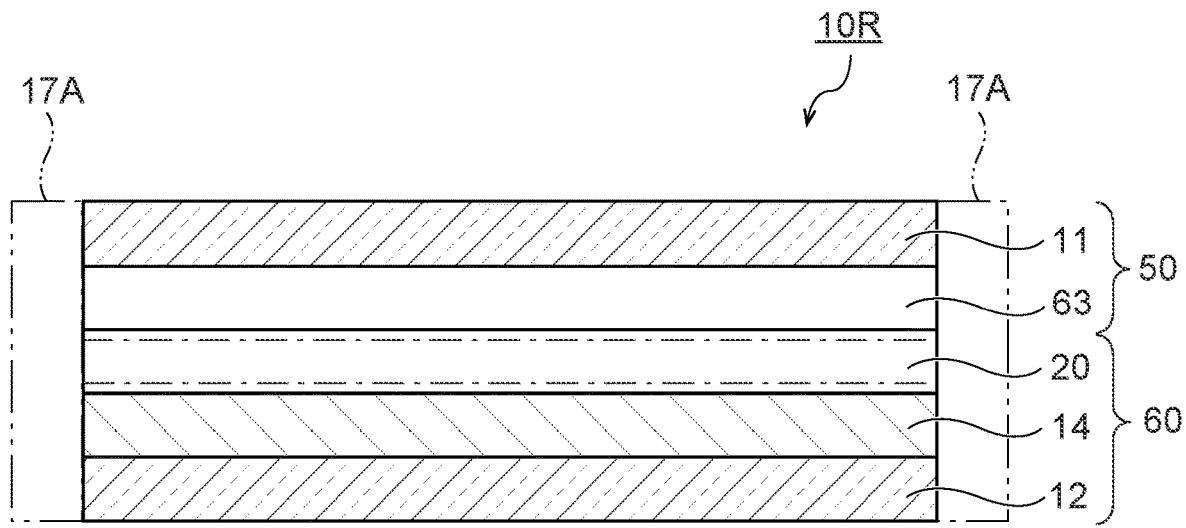
FIG. 28 is a sectional view showing a light modulating device according to a second modification of the fourth embodiment.

When the light modulating device 10Q shown in FIG. 27 is prepared, the first laminated body 50 and the second laminated body 60 each are initially prepared by a lamination process substantially similar to the steps shown in FIG. 26A and FIG. 26B. Subsequently, the first laminated body 50 and the second laminated body 60 are stacked substantially similarly to the step shown in FIG. 26C. After that, the first laminated body 50 and the second laminated body 60 are joined by laminating the first laminated body 50 and the second laminated body 60 in a vacuum state with a vacuum bag (not shown) and subsequently heating it. In this way, the first laminated body 50 and the second laminated body 60 are bonded by the thermally adhesive resin layer 63, and the light modulating device 10Q shown in FIG. 27 is obtained.

According to the present modification, since the film 33 is not provided, the layer configuration of the light modulating device 10Q is simplified. In the step of preparing the first laminated body 50 in process of creating the light modulating device 10Q, the first interlayer 13 is not exposed outward, and the thermally adhesive resin layer 63 is laminated on the first interlayer 13. Therefore, degradation of the first interlayer 13 due to moisture is suppressed, and the surface (adjacent to the second laminated body 60) of the first interlayer 13 is made flat. In FIG. 27, the sealant 17A (imaginary line) may be provided around the first laminated body 50 and the second laminated body 60.

Second Modification of Fourth Embodiment

FIG. 28 shows a light modulating device 10R according to a second modification of the present embodiment. In the light modulating device 10R shown in FIG. 28, the film 33 and the first interlayer 13 are not provided, and the thermally adhesive resin layer 63 is located between the first glass sheet 11 and the light modulating cell 20. In this case, the thermally adhesive resin layer 63 bonds the inner-side surface (the surface adjacent to the second glass sheet 12) of the first glass sheet 11 and the inner-side surface (the surface adjacent to the first glass sheet 11) of the light modulating cell 20.

When the light modulating device 10R shown in FIG. 28 is prepared, the first laminated body 50 and the second laminated body 60 each are initially prepared by a lamination process substantially similar to the steps shown in FIG. 26A and FIG. 26B. Subsequently, the first laminated body 50 and the second laminated body 60 are stacked substantially similarly to the step shown in FIG. 26C. After that, the first laminated body 50 and the second laminated body 60 are joined by laminating the first laminated body 50 and the second laminated body 60 in a vacuum state with a vacuum bag (not shown) and subsequently heating it. In this way, the first laminated body 50 and the second laminated body 60 are bonded by the thermally adhesive resin layer 63, and the light modulating device 10R shown in FIG. 28 is obtained.

According to the present modification, since the film 33 and the first interlayer 13 are not provided, the layer configuration of the light modulating device 10R is simplified. In FIG. 28, the sealant 17A (imaginary line) may be provided around the first laminated body 50 and the second laminated body 60.

The plurality of component elements described in the embodiments and the modifications may be combined as needed. Alternatively, some component elements may be deleted from all the component elements described in the embodiments and the modifications.

The invention claimed is:

1. A light modulating device comprising:
a first laminated body including a first glass sheet, a first interlayer, and a film; and
a second laminated body in which a second glass sheet, a second interlayer, and a light modulating cell are laminated, wherein
the light modulating cell includes a first cell laminated body including a first substrate, a first transparent electrode, and a first alignment layer, a second cell laminated body including a second substrate, a second transparent electrode, and a second alignment layer, and a liquid crystal layer placed between the first cell laminated body and the second cell laminated body,
the first laminated body and the second laminated body are bonded to each other by a sealant,
an air layer is formed between the film of the first laminated body and the light modulating cell of the second laminated body, and the air layer faces and is immediately adjacent to the film of the first laminated body and the light modulating cell of the second laminated body, and
the sealant is formed so as to surround the first interlayer, the second interlayer, and the light modulating cell in plan view.

2. A light modulating device comprising:
a first laminated body including a first glass sheet, a first interlayer, and a film; and
a second laminated body in which a second glass sheet, a second interlayer, and a light modulating cell are laminated, wherein
the light modulating cell includes a first cell laminated body including a first substrate, a first transparent electrode, and a first alignment layer, a second cell laminated body including a second substrate, a second transparent electrode, and a second alignment layer, and a liquid crystal layer placed between the first cell laminated body and the second cell laminated body,
the first laminated body and the second laminated body are bonded to each other by a peripheral sealant located around the first laminated body and the second laminated body,
an air layer is formed between the film of the first laminated body and the light modulating cell of the second laminated body, and the air layer faces and is immediately adjacent to the film of the first laminated body and the light modulating cell of the second laminated body,
the peripheral sealant is provided outside of an outermost end of the first laminated body and an outermost end of the second laminated body in a direction orthogonal to a direction of stacking of the first laminated body on the second laminated body, and
the peripheral sealant extends to an outermost edge of the light modulating device in the direction of stacking of the first laminated body.

3. A light modulating device comprising:
a first laminated body including a first glass sheet and a first interlayer;
a second laminated body in which a second glass sheet, a second interlayer, and a light modulating cell are laminated; and
a sealant provided around the first laminated body and the second laminated body, wherein
the light modulating cell includes a first cell laminated body including a first substrate, a first transparent electrode, and a first alignment layer, a second cell laminated body including a second substrate, a second transparent electrode, and a second alignment layer, and a liquid crystal layer placed between the first cell laminated body and the second cell laminated body,
the first laminated body or the second laminated body further includes an optically transparent adhesive film,
the first laminated body and the second laminated body are bonded to each other by the optically transparent adhesive film, and the optically transparent adhesive film directly bonds the first laminated body and the light modulating cell of the second laminated body,
the first glass sheet, the optically transparent adhesive film, the light modulating cell, the second interlayer, and the second glass sheet have a same shape in plan view,
the sealant is provided outside of an outermost end of the first laminated body and an outermost end of the second laminated body in a direction orthogonal to a direction of stacking of the first laminated body on the second laminated body, and
the sealant extends to an outermost edge of the light modulating device in the direction of stacking of the first laminated body.

4. A light modulating device comprising:
a first laminated body including a first glass sheet and a first interlayer;
a second laminated body in which a second glass sheet, a second interlayer, and a light modulating cell are laminated; and
a sealant provided around the first laminated body and the second laminated body, wherein
the light modulating cell includes a first cell laminated body including a first substrate, a first transparent electrode, and a first alignment layer, a second cell laminated body including a second substrate, a second transparent electrode, and a second alignment layer, and a liquid crystal layer placed between the first cell laminated body and the second cell laminated body, the first laminated body or the second laminated body further includes a thermally adhesive resin layer, the first laminated body and the second laminated body are bonded to each other by the thermally adhesive resin layer, and the thermally adhesive resin layer directly bonds the first laminated body and the light modulating cell of the second laminated body, the first glass sheet, the thermally adhesive resin layer, the light modulating cell, the second interlayer, and the second glass sheet have a same shape in plan view, the sealant is provided outside of an outermost end of the first laminated body and an outermost end of the second laminated body in a direction orthogonal to a direction of stacking of the first laminated body on the second laminated body, and the sealant extends to an outermost edge of the light modulating device in the direction of stacking of the first laminated body.

* * * * *